United States Patent [19]

Katashiba et al.

[11] Patent Number: 5,653,106
[45] Date of Patent: Aug. 5, 1997

[54] EXOTHERMIC HEAT GENERATING APPARATUS

[75] Inventors: Hideaki Katashiba; Ryoji Nishiyama; Hiroshi Kimura; Tsuneo Yumikura, all of Hyogo; Akira Doi, Gifu; Yoshiaki Akase; Tomoko Masuda, both of Hyogo, all of Japan

[73] Assignee: Mitsubishi Denki Kabushiki Kaisha, Tokyo, Japan

[21] Appl. No.: 348,033

[22] Filed: Dec. 1, 1994

[30] Foreign Application Priority Data

Dec. 24, 1993 [JP] Japan ..................... 5-327777

[51] Int. Cl.$^6$ ..................... F01N 3/28; F28D 15/00
[52] U.S. Cl. ................ 60/300; 123/142.5 R; 165/104.12
[58] Field of Search ................ 60/300; 123/142.5 R; 165/104.12

[56] References Cited

U.S. PATENT DOCUMENTS

| | | | |
|---|---|---|---|
| 3,973,552 | 8/1976 | Ervin | 165/104.12 |
| 4,991,644 | 2/1991 | Miaoulis | 165/104.12 |
| 5,398,747 | 3/1995 | Miaoulis | 165/104.12 |

OTHER PUBLICATIONS

D. R. Brown, et al "Chemical Energy Storage System for Solar Electric Generating System (SEGS) Solar Thermal Power Plant" Nov. 1992.

M. E. Perez–Davis, et al "Energy Storage For a Lunar Base by the Reversible Chemical Reaction: CaO +H2O =Ca (OH)2" June 1990.

*Primary Examiner*—Douglas Hart
*Attorney, Agent, or Firm*—Wolf, Greenfield & Sacks, P.C.

[57] ABSTRACT

An exothermic heat generating apparatus is preferably used as a heat source for rapidly heating in a vehicle or the like, to enable repetition of stable exothermic reaction for long terms.

In the apparatus, a closed cycle includes a reactor filled with alkali earth oxide, a water tank, a water supply pipe to supply water from the water tank into the reactor, and a reflux pipe to return the water from the reactor to the water tank. Reversible reaction between the alkali earth oxide and the water is carried out in the closed system. A pump supplies the reactor with water, and a solenoid valve controls a water supply. The exothermic heat generating apparatus uses heat generated by hydration reaction of the alkali earth oxide to rapidly heat a catalytic section, a cooling water section, an air intake section and the like at a time of engine start-up.

18 Claims, 17 Drawing Sheets

INFRARED ABSORPTION SPECTRUM OF
DETERIORATED CaO POWDER (cm⁻¹)

EXOTHERMIC HEAT GENERATING APPARATUS

BACKGROUND OF THE INVENTION

1. Field of the Invention

The present invention relates to an exothermic heat generating apparatus which is improved so as to enable repetition of stable exothermic reaction for long periods. For example, the exothermic heat generating apparatus is preferably used as a heat source for rapidly heating in a vehicle or the like. Further, in a cold starting time, the apparatus is used to heat a catalytic section, a cooling water section, an air intake section and the like to provide a substantial warm-up state at a time of engine start-up within a period of tens seconds. Alternatively, the apparatus is used as an auxiliary heat source for a power station. As one example, a description will hereinafter be given of an on-vehicle exothermic heat generating apparatus for use in a vehicle.

2. Description of the Related Art

Alkali earth oxides including $MgO$, $CaO$, $SrO$, and $BaO$ react with water to generate hydroxides, respectively. Heating can decompose the hydroxides to generate the original oxides while releasing the water. The hydroxides including $Mg(OH)_2$, $Ca(OH)_2$, $Sr(OH)_2$, and $Ba(OH)_2$ are said to have respective decomposition temperatures of 260° C., 480° C., 580° C., and 730° C. Therefore, it is basically possible to establish a reversible cycle by using any one of the alkali earth oxides.

Further, since the respective hydroxides have the inherent decomposition temperatures, it is also possible to mix the oxides at desired rates so as to prepare a range of the decomposition temperatures according to a range of obtained regeneration temperatures in some applications. For example, regeneration at lower temperatures can be realized by mixing $MgO$ and $CaO$.

As an example, a description will now be given of calcium oxide. It is known that the calcium oxide reacts with splashed water to rapidly generate exothermic heat reaching the maximum temperature of about 400° C. In reality, this exothermic reaction is widely put to practical use for one-time heating purpose in sake, a lunch box, or the like. When the water is used, a calorific value is 65.9 KJ (i.e., 213 cal/g in total weight including $CaO$ and $H_2O$). When water vapor is used, the calorific value is 109.3 KJ (i.e., 352 cal/g) because evaporation heat of water is added. However, it is difficult to put a water vapor system to practical use since the water vapor system requires a pressure-proof container.

The exothermic reaction can be applied to a vehicle as disclosed in Japanese Patent Publications (Kokai) Nos. 59-208118 and 5-141228. In the above patents, calcium oxide particles are preset in a catalytic section of the vehicle, and water is introduced through another passage into the catalytic section at a time of engine start-up to cause the exothermic reaction. Further, decomposition reaction is also caused to provide the original calcium oxide during travelling.

However, the exothermic heat generating apparatus disclosed in the above cited references can not exhibit its performance for long terms due to the following reasons. This is because these apparatus employ open systems, and their effects are inevitably deteriorated due to a carbon dioxide gas in air. That is, after the calcium oxide is changed into the calcium hydroxide, the heating can easily return the calcium hydroxide to the calcium oxide in an earlier period. However, the calcium hydroxide may be left as it is for a long time since, for example, the vehicle is left overnight. In such a case, the calcium hydroxide gradually sucks in the carbon dioxide gas in the air through an exhaust vent of a silencer, and is changed into calcium carbonate. The calcium carbonate can not be easily decomposed due to its high decomposition temperature of 840° C. As a result, an amount of the calcium oxide serving as reactant is gradually reduced. After a week, 100% calcium carbonate is generated, resulting in complete loss of an initially designed performance.

FIG. 1 is a graph showing a rate of deterioration of the calcium oxide in the air by using as indexes an increase in weight of the calcium oxide left in dry nitrogen or in moist nitrogen. The ordinate axis defines an increased amount of weight (percent), and the transverse axis defines a time (min). The characteristic curve a shows an increased amount of weight of calcium oxide powder left in the moist nitrogen, and the characteristic curve b shows an increased amount of weight of a calcium oxide press molded product in the moist nitrogen. Further, the characteristic curve c shows an increased amount of weight of the calcium oxide powder in the dry nitrogen, and the characteristic curve d shows an increased amount of weight of the calcium oxide press molded product in the dry nitrogen. It can be understood from the drawing that the rate of deterioration in the moist nitrogen is four times faster than that in the dry nitrogen. The result is natural since the calcium oxide can react with moisture.

FIG. 2 shows an infrared absorption spectrum of samples (of the calcium oxide powder) which are left in the air for one night and day. It is apparent that a tremendously large amount of carbonation is generated though the carbon dioxide gas concentration in the air is only 0.003%. This is because the generating calcium hydroxide can easily react with the carbon dioxide gas.

The conventional exothermic heat generating apparatus employs the open system using the reversible reaction between the alkali earth oxide and the water. As a result, there are problems in that its effect is inevitably deteriorated due to the carbon dioxide gas in the air, and can not be exhibited for long terms.

SUMMARY OF THE INVENTION

In order to overcome the above problems, it is an object of the present invention to provide an exothermic heat generating apparatus which enables repetition of stable exothermic reaction for long periods. It is a special object of the present invention to provide an exothermic heat generating apparatus which can be effectively used as, for example, a vehicle heat source to rapidly heat and activate an exhaust gas purifying catalyst for purifying an exhaust gas at a time of vehicle engine start-up so as to reduce exhaust of unburned components in the cold season, or as an auxiliary heat source to carry out heat regeneration by hot and high pressure steam at a time of low load operation, and to operate at a time of a rapid rise of load in a power station.

According to the present invention, for achieving the above-mentioned objects, there is provided an exothermic heat generating apparatus having a closed cycle including a reactor filled with alkali earth oxide, a water tank to store water, a water supply pipe to supply the water in the water tank into the reactor, and a reflux pipe to return the water from the reactor to the water tank. The exothermic heat generating apparatus includes water supply means for controlling water supply to and drain from the reactor, heating means for heating and decomposing alkali earth hydroxide in the reactor to regenerate the alkali earth oxide, and reaction control means for controlling the water supply means to control reversible reaction between the alkali earth oxide and the water, thereby utilizing heat generated by hydration reaction of the alkali earth oxide. As stated above, the reversible reaction between the alkali earth oxide and the water is carried out in the closed system. As a result, it is possible to stably and repeatedly carry out the reversible reaction for long terms. Further, it is possible to control the water supply to and the drain from the reactor by the reaction control means and the water supply means with high accuracy, and conveniently control the reversible reaction with high accuracy.

A composition ratio of the alkali earth oxide to the water in the closed cycle is preferably set to provide water-excessive composition. As a result, it is possible to avoid reduction of reactivity at a time of the hydration reaction and avoid reduction of the calorific value so as to provide calorific values according to designed values and promote the hydration reaction.

In a preferred aspect, at least one of a rare gas and a nitrogen gas is sealed into the closed cycle. As a result, it is possible to avoid leakage of the closed cycle, entrance of $CO_2$ gas, and deterioration of performance.

An alkali earth oxide molded product preferably has a flat form, and the reactor is filled with layered molded products. Further, heat-resisting perforated members are inserted into gaps between the layers, and into gaps extending parallel to a layering direction. As a result, it is possible to improve the fill factor, and provide a smaller reactor. In addition, the heat-resisting perforated members inserted into the gaps can ensure a water flow path for long terms, and can enhance distribution of the water so as to accelerate a reaction rate and improve reversibility of the reaction.

In a preferred aspect, the water is supplied into the reactor from a plurality of positions including upper and lower positions, resulting in a more rapid rise of the reaction.

The water tank preferably includes, starting from the inside, a water storage tank, a heater for heating the water, a layer of heat regenerating material having the melting point ranging from 10° to 30° C., and a heat insulating layer. In addition, a water temperature sensor is mounted to detect a water temperature. It is thereby possible to effectively avoid dissipation of the water in the water tank, and actuate the heater so as to heat the water according to appropriate timing, resulting in efficient prevention of freezing of the water.

In a preferred aspect, a condenser is provided on the side of the reflux pipe of the water tank, thereby efficiently condensing the water.

The reactor preferably includes the heater as heating means. It is thereby possible to heat and decompose the alkali earth hydroxide so as to completely regenerate the alkali earth oxide.

In a preferred aspect, an on-vehicle exothermic heat generating apparatus includes the exothermic heat generating apparatus, and is provided with operating state detecting means for detecting an operating state of an internal combustion engine, and reaction state detecting means for detecting a state of reaction between the alkali earth oxide and the water depending upon states of the reactor and the water tank. The reaction control means controls the reversible reaction between the alkali earth oxide and the water depending upon the operating state and the reaction state. As a result, it is thereby possible to efficiently carry out reversible reaction. Further, the exothermic heat caused by the hydration reaction of the alkali earth oxide can rapidly heat a catalytic section, an air intake section and the like in a vehicle so as to provide a substantial warm-up state at a time of engine start-up without a large capacity vehicle power source, a large capacity battery, or the like. Thus, it is possible to reduce exhaust of unburned components. In addition, after warm-up, heat of an exhaust gas can decompose the alkali earth hydroxide to regenerate the alkali earth oxide.

The condenser is preferably mounted in a vehicle travelling wind collision section or in an intake pipe of the internal combustion engine. Thus, water vapor from the reactor is cooled and condensed by travelling wind or intake wind. As a result, it is possible to effectively condense the water vapor, and heat the intake air so as to promote vaporization of fuel and reduce an unburned gas.

In a preferred aspect, an exhaust gas purifying catalyst is supported on the reactor or a surface of heat exchanging means mounted thereto, and either the reactor or the heat exchanging means is mounted in an exhaust pipe. It is thereby possible to rapidly heat and activate the catalyst, and reduce exhaust of unburned components and a harmful gas in the cold season.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
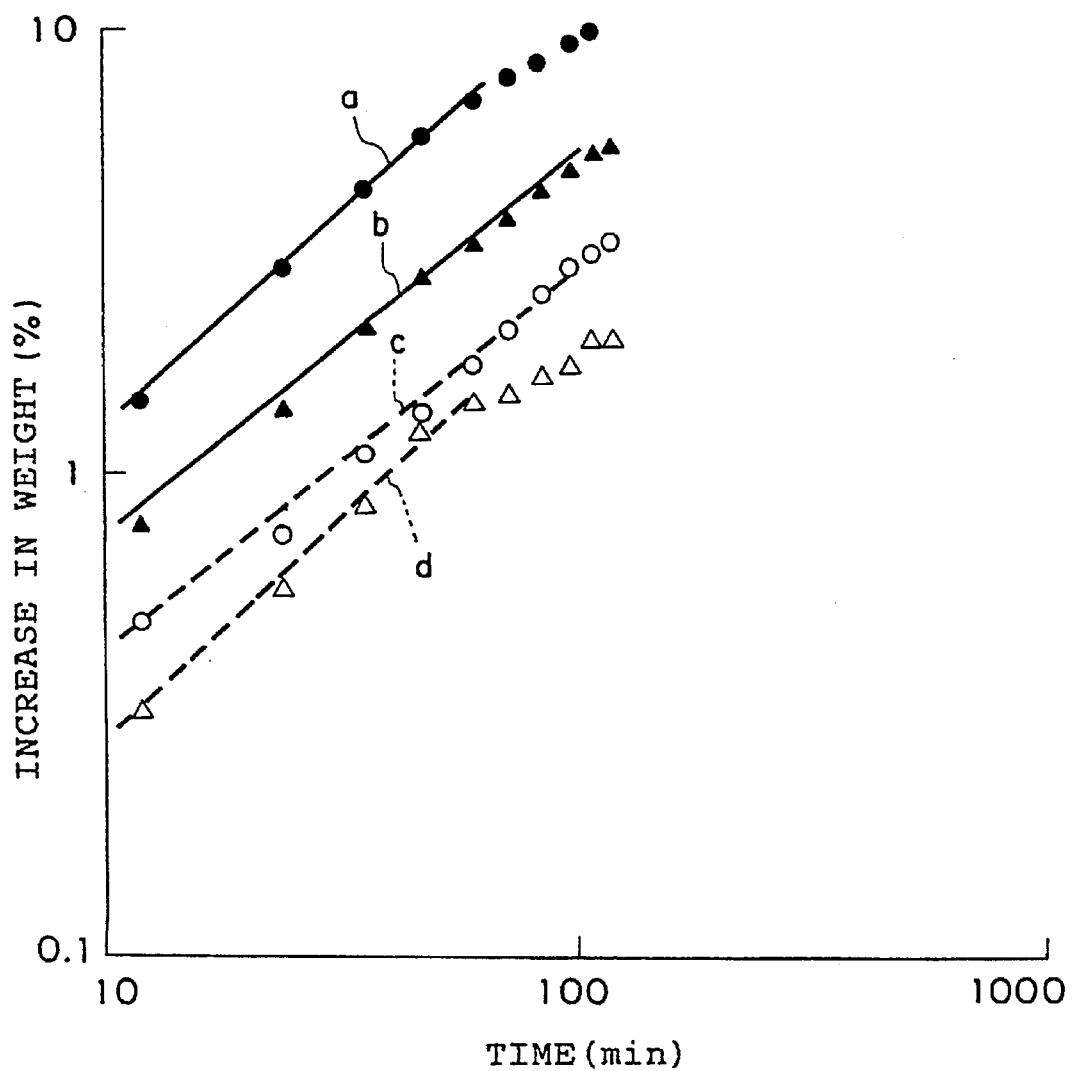
FIG. 1 is a graph showing a rate of deterioration of calcium oxide, and increased amounts of weight in dry nitrogen and in moist nitrogen.
Figure 2:
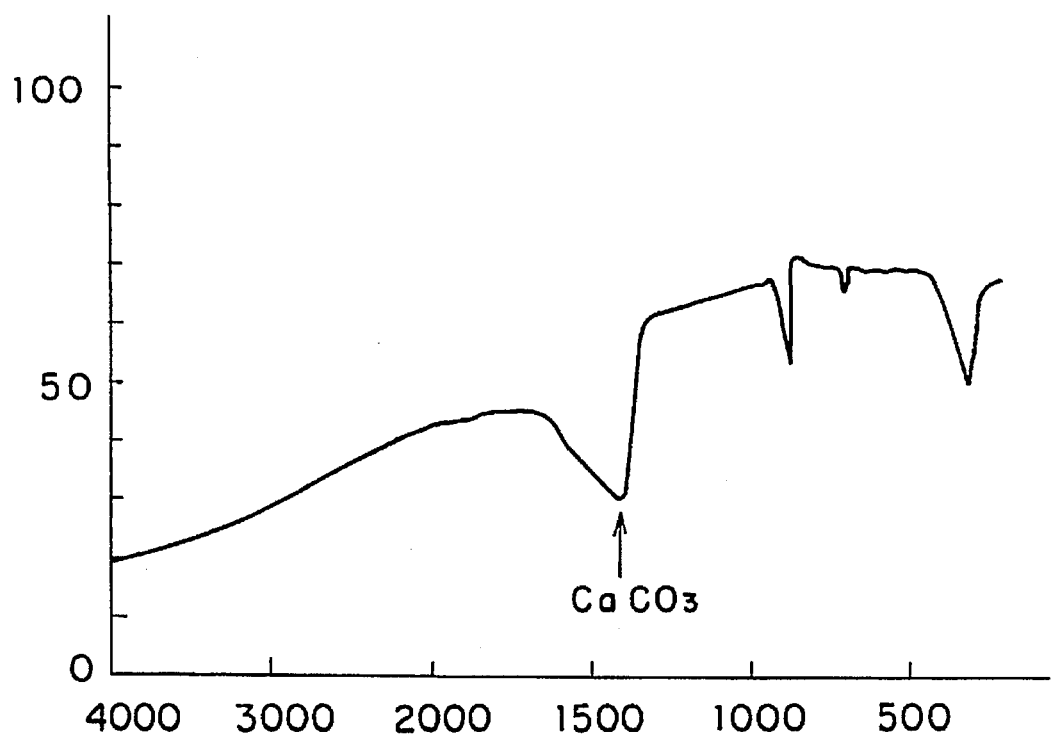
FIG. 2 is an infrared absorption spectrum of deteriorated calcium oxide powder.
Figure 3:
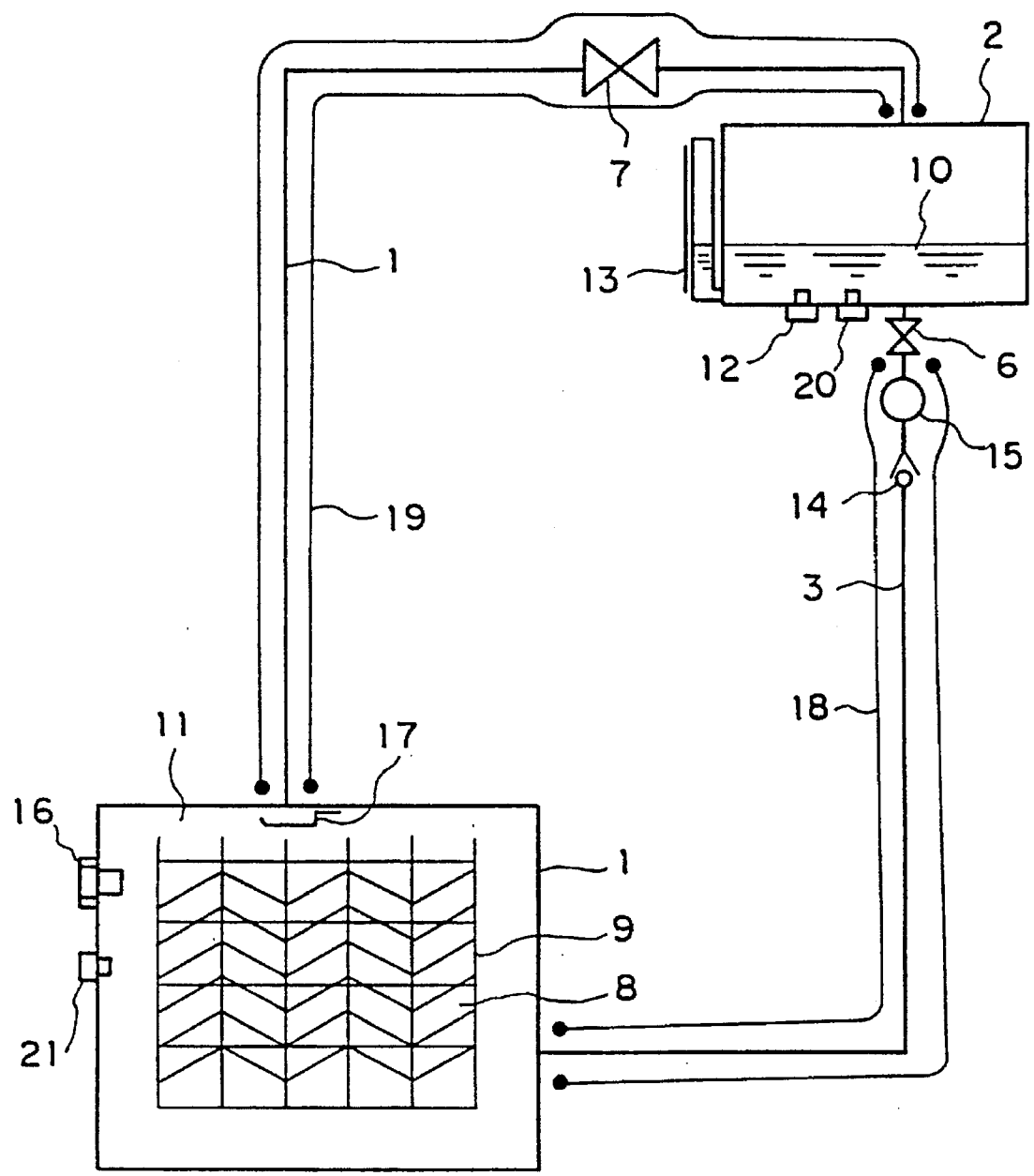
FIG. 3 is a view showing a structure of a first embodiment of an exothermic heat generating apparatus according to the present invention.

FIG. 3 is a view showing a structure of one embodiment of an exothermic heat generating apparatus according to the present invention. A description will now be given of calcium oxide as one example of alkali earth oxides. In the drawing, reference numeral 1 means a reactor made of metal which is never degenerated or deteriorated even if the reactor is exposed to a high temperature caused by exothermic reaction of the calcium oxide, such as austenitic stainless steel SUS304, NAR315SN, ferritic stainless steel SUH-409L, NAR-FHZ1, or nickel-base super alloy Inconel. Reference numeral 2 means a water tank, and 10 is water. For example, when the apparatus is used to rapidly heat an exhaust gas purifying catalyst for use in vehicle, a vehicle equipped with an engine of 2000 cc class has catalytic capacity of about 2 l. In order to heat the catalyst and an exhaust gas at a time of engine start-up to the temperature of 300° C., 700 cc water is required to cause the exothermic reaction with about 2 Kg calcium oxide.

Reference numeral 12 means a water detecting sensor, such as a dielectric constant sensor or a refractive index sensor, mounted to a bottom surface of the water tank 2 to detect absence or presence of the water. Reference numeral 13 means a water sensor to detect and transform an amount of water in the water tank 2 into an electrical signal. Reference numeral 20 means a water temperature sensor such as a thermocouple thermometer or a resistance temperature sensor, to detect the temperature of the water 10.

Reference numeral 3 means a water supply pipe for introducing the water from the water tank 2 into the reactor 1, 14 is a check valve mounted to the water supply pipe 3 to avoid a back flow of the water or the water vapor from the reactor 1, and 15 is a pump to introduce the water in the water tank 2 into the reactor 1. In this case, the pump 15 requires delivery capacity of 4.21 l/min so as to send the 700 cc water to the reactor within a period of ten seconds. For example, a gear pump or a centrifugal pump having delivery capacity of 4.21 l/min or more is used as the pump 15. In view of capacity of the pump 15, the water supply pipe 3 has an inner diameter of about 10 to 15 mm. Reference numeral 5 means a reflux pipe mounted on a top surface of the reactor 1 in order to carry the water vapor from the reactor 1 to the water tank 2. Reference numeral 6 means a first solenoid valve mounted in the course of the water supply pipe 3 to control an inflow of the water sent to the reactor 1, and 7 is a second solenoid valve mounted in the course of the reflux pipe 5 to control an inflow of the water vapor caused from the reactor 1. Further, reference numerals 18, 19 mean an electric heater (a tape heater being employed in the embodiment) to avoid operational failure of the exothermic heat generating apparatus due to the frozen reflux pipe 5. Water supply means in the embodiment includes the first and second solenoid valves 6 and 7, the pump 15, and the check valve.

Reference numeral 8 means a pellet-shaped calcium oxide molded product, 9 is a perforated pipe accommodating the molded product 8, 16 is a temperature sensor such as a thermocouple thermometer or a resistance temperature sensor, to measure temperature in the reactor 1, and 21 is a pressure sensor to detect pressure in the reactor 1. Reference numeral 17 means a protective wall to prevent the calcium oxide or the hydroxide calcium splashed by the exothermic reaction from blocking an inflow port of the reflux pipe 5. The hydroxide calcium is heated and decomposed to regenerate the calcium oxide. In this case, heat of an exhaust gas and exhaust heat of an internal-combustion engine are used as on-vehicle heating means.

Further, a closed cycle (piping system) is filled with at least one or more of an inactive gas 11 except the carbon dioxide gas, a rare gas and a nitrogen gas. In the embodiment, the nitrogen gas fills the closed cycle to avoid leakage of the closed cycle, particularly to avoid entrance of $CO_2$ gas causing serious performance deterioration. Further, the nitrogen gas optimally controls a reaction rate, and reduce a rate of corrosion of metallic material. When the inactive gas is insufficiently enclosed, it is impossible to sufficiently avoid leakage from the atmosphere at an inoperative time. Excessive inactive gas causes excessively high pressure at a time of the exothermic reaction. Therefore, from a practical standpoint, absolute pressure is preferably in the range of 0.5 to 2 atm.

Figure 4:
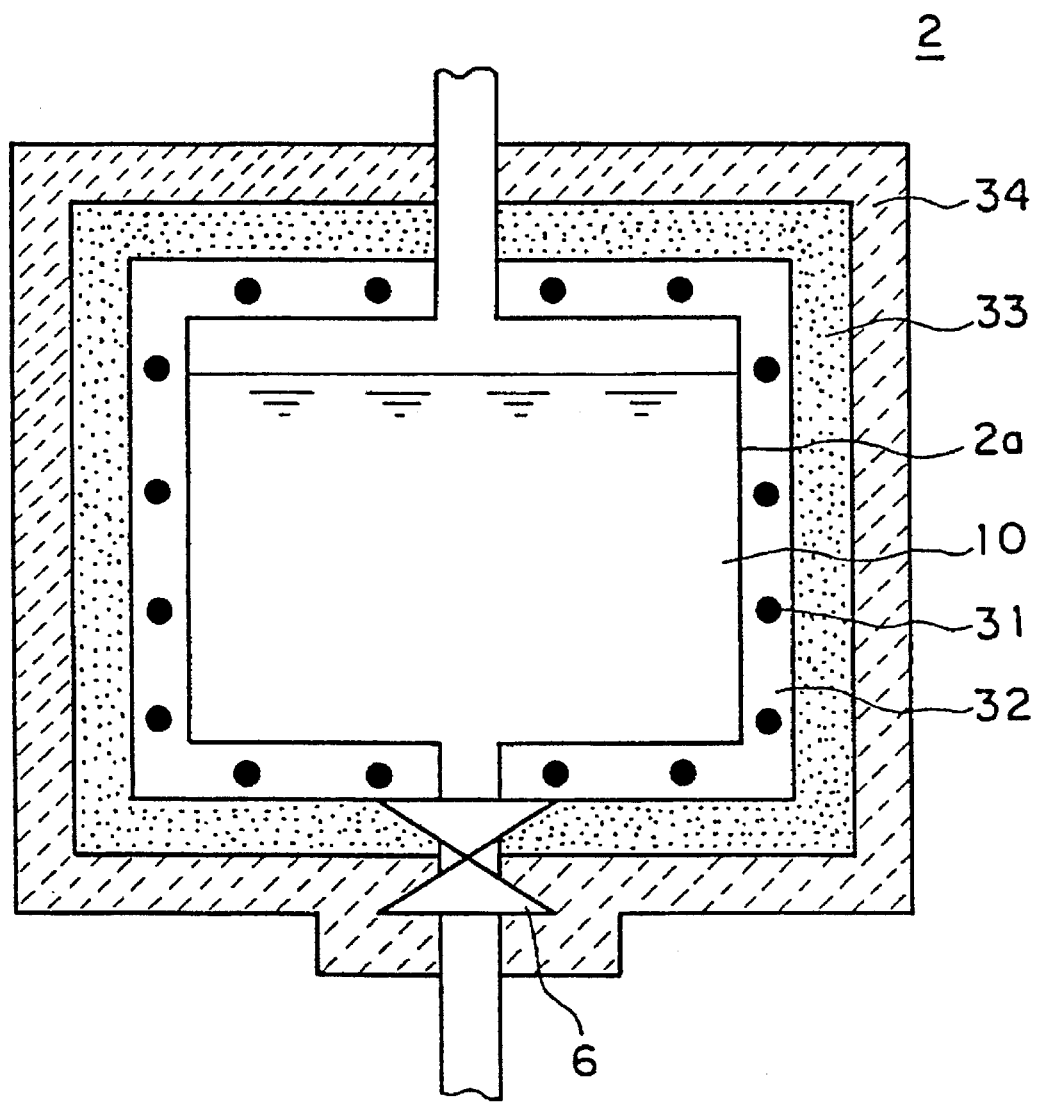
FIG. 4 is a typically sectional view showing a detailed structure of a water tank 2 in FIG. 3.

FIG. 4 is a typically sectional view showing a detailed structure of the water tank 2 in FIG. 3. The illustrative structure is effective in preventing freezing of the water tank for a winter period, and is particularly indispensable, as freezing preventing means, for the on-vehicle exothermic heat generating apparatus from the practical standpoint. In FIG. 4, reference numeral 2a means a water storage tank, 31 is a heater (an electric heater being employed in the embodiment) to heat the water 10, 32 is an insulator accommodating the electric heater 31, and 33 is a heat regenerating material accommodated in a container. The melting point of the heat regenerating material is set to temperatures ranging from 10° to 30° C., which are suitable for prevention of water freezing by the minimum energy for long terms. Reference numeral 34 is a heat insulating layer. A first solenoid valve 6 is embedded in the heat insulating layer 34 to avoid the water freezing at its position.

A description will now be given of the operation in the water tank 2. Hot water vapor is vaporized from the reactor 1 and is condensed during decomposition reaction to generate the calcium oxide. The condensed water vapor is cooled to some extent, and is thereafter dropped in the water tank. Waste-heat of the water can partially melt the heat regenerating material 33 through the electric heater layer. The heater layer is interposed between the water tank and the heat regenerating material so that almost all the exothermic heat can be used to heat the water and melt the heat regenerating material, resulting in an enhanced heat efficiency. The heat insulating layer is additionally provided on the outside of the heat regenerating layer, thereby effectively preventing heat dissipation.

Even if an outside air temperature is 0° C. or less, it is possible to prevent the freezing of the water without the electric heater 31 for a period of substantially one night and day. However, it is impossible to prevent the freezing for a period of about one week or more. In this case, the electric heater 31 is occasionally energized by using an on-vehicle battery serving as a power source, thereby effectively preventing the freezing of the water. Further, ON-OFF states of the electric heater are controlled after the water temperature is measured by the water temperature sensor 20 provided for the water tank 2 to detect the water temperature as shown in FIG. 3. It is necessary that the 5° C. or more water temperatures are held from the practical standpoint. Therefore, it is sufficient that the electric heater 31 is energized at water temperatures of 5° C. or less.

Even when the water supply pipe 3 extending from the first solenoid valve 6 to the reactor is cooled at temperatures of 0° C. or less in the severe cold season, it is also possible to introduce the water into the reactor without no freezing of the water in the piping by appropriately setting the water temperature in the water tank.

Calcium chloride hexahydrate group heat regenerating materials are available as the heat regenerating material having the melting points ranging from 10 to 30 degrees, and are disclosed in Japanese Patent Publications (Kokoku) Nos. 59-41668 (Heat Regenerating Material), 62-57674 (Heat Regenerating Material), and 63-1477 (Heat Regenerating Material) issued to the inventors. All the compositions are available for long terms.

The tape heaters 18, 19 are provided to prevent freezing of the pump 15, the check valve 14, the second solenoid valve 7 mounted in the piping system in which the heat regenerating material can not be easily charged. Further, it is necessary to energize and heat the tape heaters depending upon the temperature sensor 16 of the reactor 1 immediately before occurrence of reaction when, for example, a vehicle is stopped. Needless to say, the heater layer is coated to eliminate unnecessary heat loss with appropriate heat insulating material layer. If the apparatus is used in a severe winter region, the operation of the apparatus can be further ensured by forming the same structure including three layers at these sections as the structure formed at the water tank. In this case, a suitable temperature sensor may be provided to appropriately energize and heat the heater.

A description will now be given of a method of filling the reactor 1 with the calcium oxide.

The calcium oxide molded product 8 is accommodated in the perforated pipe 9 for purpose of enhanced reversible reactivity as well as improved distribution of water at a time of hydration reaction.

When the calcium oxide molded product is accommodated in the perforated pipe, pressing is required to enhance the fill factor. This is because hand pressing can provide the bulk density on the order of only 0.6 g/cm$^3$. The bulk density ranging from 1.0 to 2.0 g/cm$^3$ is required in view of a designed calorific value. Thus, the press molding pressure should be in the range of 1 to 9 ton/cm$^2$. Table 1 shows the experimental result concerning characteristics (such as bulk density) between the press molding pressure and the calcium oxide molded product (pressed product). The above bulk density of the calcium oxide molded product corresponds to the fill factor ranging from 30 to 60% (the density of calcium oxide being set to 3.37 g/cm$^3$).

TABLE 1

| PRESS MOLDING PRESSURE (ton/cm$^2$) | WEIGHT (g) | THICKNESS (mm) | VOLUME (cm$^3$) | BULK DENSITY (g/cm$^3$) | FILL FACTOR (%) | VOIDS (%) |
| --- | --- | --- | --- | --- | --- | --- |
| 1 | 0.26 | 1.57 | 0.208 | 1.25 | 37 | 63 |
| 3 | 0.26 | 1.19 | 0.158 | 1.64 | 49 | 51 |
| 9 | 0.28 | 1.03 | 0.137 | 2.04 | 61 | 39 |

Alternatively, the calcium oxide molded product may be obtained by substituting the calcium oxide by the calcium hydroxide, pressing, and after-baking for decomposition. The experimental results are shown in Tables 2 and 3. Table 2 shows characteristics between calcium hydroxide press molding pressure and the molded product (pressed product). Table 3 shows characteristics between the calcium hydroxide press molding pressure and the calcium oxide molded product after baking the molded product (pressed product).

TABLE 2

| PRESS MOLDING PRESSURE (ton/cm$^2$) | WEIGHT (g) | THICKNESS (mm) | VOLUME (cm$^3$) | BULK DENSITY (g/cm$^3$) | FILL FACTOR (%) | VOIDS (%) |
| --- | --- | --- | --- | --- | --- | --- |
| 1 | 0.32 | 1.509 | 0.200 | 1.60 | 71 | 27 |
| 3 | 0.30 | 1.258 | 0.167 | 1.80 | 80 | 20 |
| 9 | 0.31 | 1.213 | 0.161 | 1.93 | 86 | 14 |

TABLE 3

| PRESS MOLDING PRESSURE (ton/cm$^2$) | WEIGHT (g) | LOSS IN WEIGHT (%) | THICKNESS (mm) | VOLUME (cm$^3$) | BULK DENSITY (g/cm$^3$) | FILL FACTOR (%) | VOIDS (%) |
| --- | --- | --- | --- | --- | --- | --- | --- |
| 1 | 0.23 | 28 | 1.467 | 0.171 | 1.34 | 40 | 60 |
| 3 | 0.22 | 27 | 1.253 | 0.146 | 1.50 | 44.5 | 55.5 |
| 9 | 0.23 | 26 | 1.250 | 0.146 | 1.57 | 46.7 | 53.3 |

The product molded at the press molding pressure ranging from 1 to 9 ton/cm$^2$ exhibits the bulk density ranging from 1.3 to 1.6 g/cm$^3$ after baking. Therefore, it is preferable that the calcium oxide is directly pressed to provide higher fill factor. However, since more graduate reactivity is exhibited by initially using the calcium hydroxide, the calcium hydroxide may be convenient depending upon a place where it is used.

A rate of reaction of the calcium oxide molded product with the water varies depending upon a surface area of the calcium oxide molded product. Thus, the surface area is important as parameter. The calcium oxide molded product for use in vehicle preferably has the surface area in the range of 5 to 15 cm$^2$/g. When the surface area is less than 5 cm$^2$, the reaction rate becomes slow. Further, an excessively large surface area deteriorates the reversible reactivity. The surface area value can be obtained by calculation on the basis of the surface area of the molded product, and is completely irrelevant to, for example, the porosity of the molded product.

Figure 5:
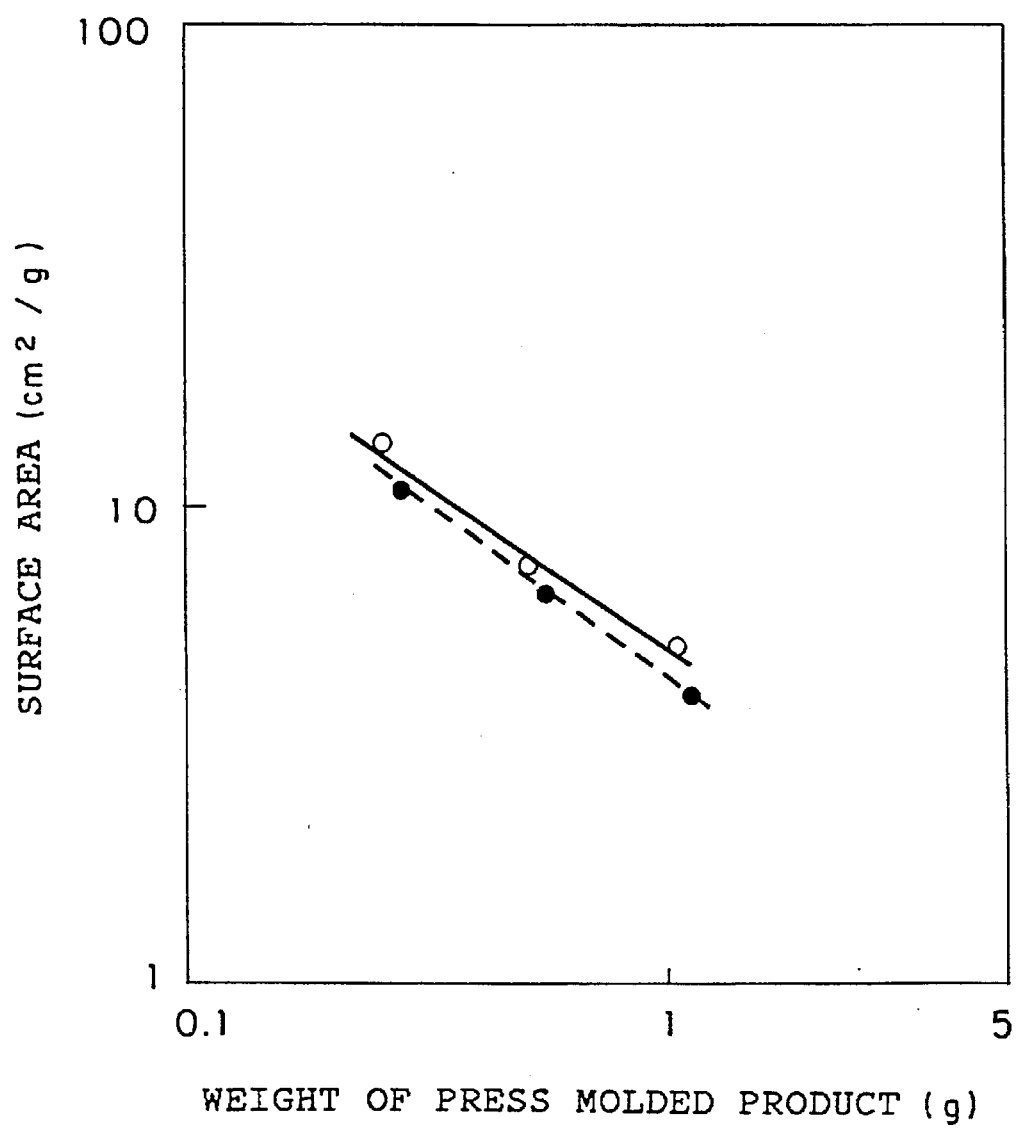
FIG. 5 is a characteristic view showing a relationship between press molding pressure and a surface area of a calcium oxide molded product according to the present invention.

FIG. 5 is a characteristic view showing a relationship between the press molding pressure and the surface area of the calcium oxide molded product. The ordinary axis defines the surface area (cm$^2$/g), and the transverse axis defines weight (g). Further, the solid line defines a characteristic of a molded product at the press molding pressure of 3 ton/cm$^2$, and the broken line defines another characteristic of another molded product at the press molding pressure of 9 ton/cm$^2$.

A plurality of through-holes may be preferably provided in the molded product to more enhance the reaction rate. It is thereby possible to increase a rate of penetration of the water into the molded product, and enhance the reversible reactivity.

Figure 6:
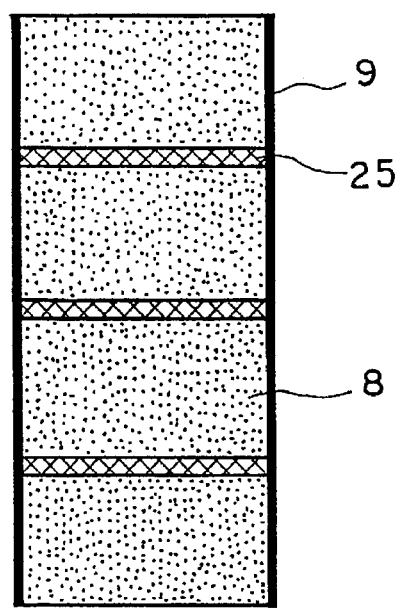
FIG. 6 is a typically sectional view illustrating a state in which the calcium oxide molded product is accommodated in a reactor according to the present invention.

FIG. 6 is a typically sectional view illustrating a state in which the calcium oxide molded product 8 is accommodated in the perforated pipe 9 according to a method of filling the reactor 1 with the calcium oxide. The embodiment is carried out at the cost of some degree of fill factor of the calcium oxide molded product. However, a heat-resisting perforated member 25 such as a thin heat-resisting metal mesh, a heat-resisting perforated metal, or a ceramics plate, is interposed between a gap extending perpendicular to a layering direction of the calcium oxide molded product, that is, between the laminated layers. As set forth above, the heat-resisting perforated member is interposed between the layers, thereby ensuring a water flow path for long periods, and improving the reversible reactivity.

The same holds true for gaps extending parallel to the layering direction. Though hydration of the calcium oxide generates the calcium hydroxide, the calcium hydroxide is expanded at a time of reaction because of its small density (of 2.24 g/cm$^3$).

Figure 7:
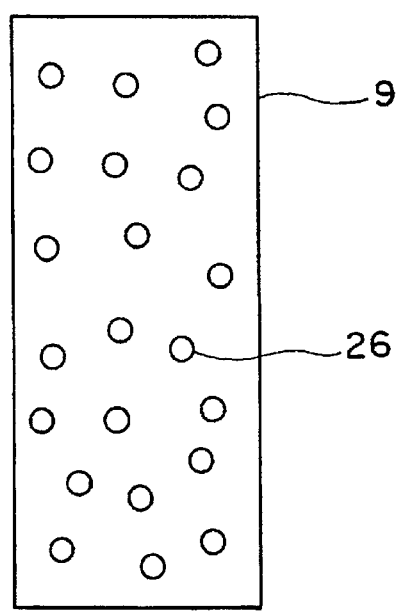
FIG. 7 is a typical view showing a sample of a perforated pipe for accommodating the calcium oxide molded product according to the present invention.

In order to more enhance the above effects, it is preferable that the calcium oxide molded product is accommodated in the thin perforated pipe 9 made of heat-resisting metal or ceramics, and many through-holes 26 are provided in a pipe wall of the perforated pipe as shown in the typical view of FIG. 7. It is thereby possible to, in the pipe, manage a variation in volume occurring depending upon expansion and shrinkage of the calcium oxide, resulting in improved reversible reactivity.

Water-excessive composition is preferable for a composition ratio of the calcium oxide to the water in the closed cycle of the exothermic heat generating apparatus. This is because unreacted water is always vaporized and can be easily scattered due to the high generation temperature at the time of reaction, and a 1:1 mole ratio of the composition causes water-deficient composition at a reaction zone. As a result, the reactivity is considerably below 100% so that the resultant calorific value is insufficient in view of the designed value. Alternatively, when an excessive amount of water is used, the regenerated heat is consumed in heating and vaporizing the excessive water to reduce the calorific value which is available in the exothermic heat generating apparatus. Hence, it is appropriate from the practical standpoint that the mole ratio of the water to the calcium oxide falls in the range of 1.10 to 1.30.

Figure 8:
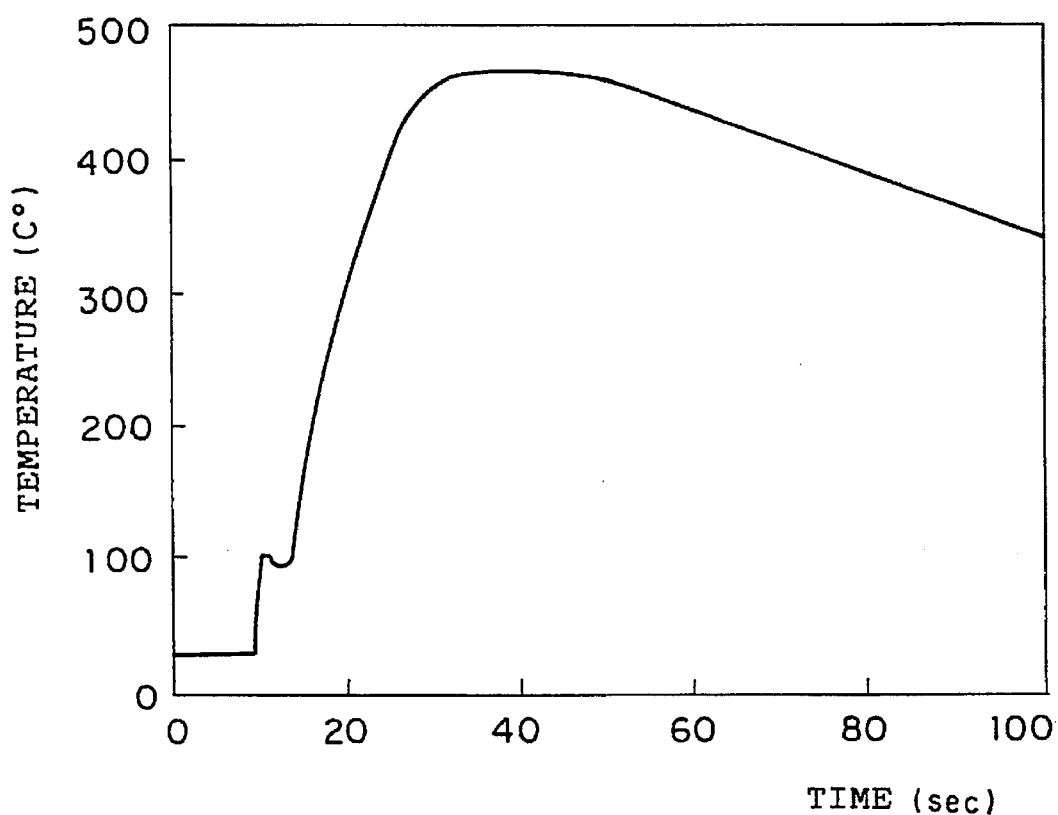
FIG. 8 is a characteristic view showing an increase in temperature when hydration reaction of the calcium oxide occurs in a closed top container according to the present invention.

FIG. 8 is a characteristic view showing an increasing rate of temperature when the 3 g calcium oxide (CaO) reacts with the 1 cc water in a closed top container. The ordinate axis defines temperature (°C.), and the transverse axis defines time (sec).

In an initial period, the temperature increases to be slightly greater than 100° C. within a period of few seconds, and thereafter is settled in the range of substantially 100° C. It is apparent that the settled point is generated by hydration reaction of liquid water. The unreacted water is heated by the exothermic reaction and is vaporized to generate the water vapor. As a result, a temperature rise of CaO is reduced, and the temperature is settled in the range of about 100° C., that is, of the boiling point of the water. A rapid temperature rise thereafter is caused by hydration reaction of the water vapor, and the hydration reaction can be regarded as a main cause of the temperature rise. Therefore, in the exothermic heat generating apparatus employing CaO and the water, its practicality chiefly depends upon the degree to which the hydration reaction of the water vapor can be smoothly caused.

As seen from the foregoing, the reactor is indispensably provided with a structure in which top priority is given to the vapor hydration. Further, the water-excessive composition can more highly promote the hydration reaction of the water vapor than water-deficient composition or stoichiometric composition.

Figure 9:
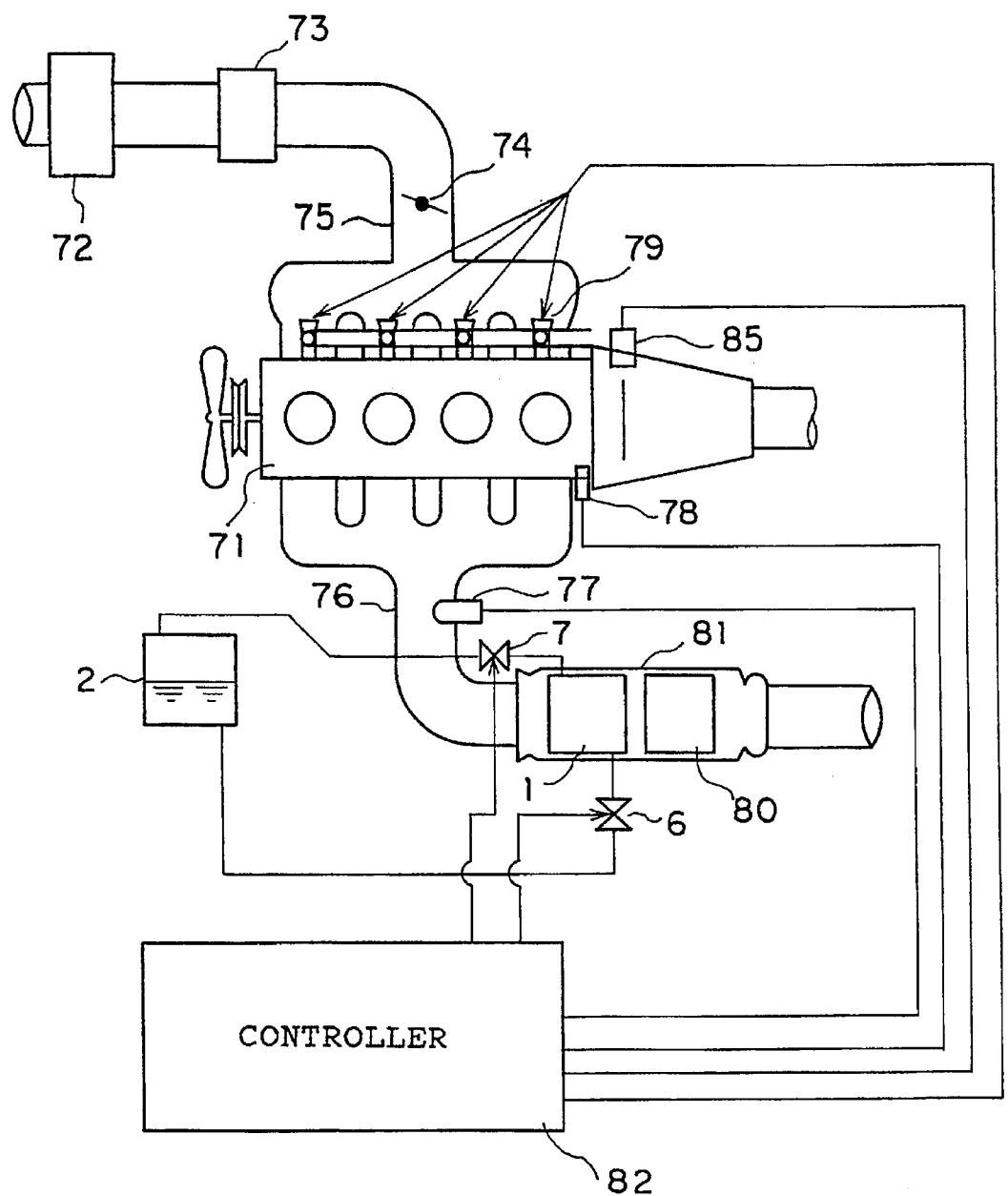
FIG. 9 is a view showing a structure of an on-vehicle exothermic heat generating apparatus in one aspect of the first embodiment of the exothermic heat generating apparatus according to the present invention.

FIG. 9 is a view showing a structure of one embodiment of an on-vehicle exothermic heat generating apparatus which is obtained by adapting the exothermic heat generating apparatus in FIG. 3 to earlier activation of three way catalyst converter rhodium for purifying a vehicle exhaust gas. In the drawing, reference numeral 71 means an engine, 72 is an air cleaner to remove dust in the atmosphere, 73 is an intake air sensor to measure an intake air flow into the engine 71, and 74 is a throttle valve to change a sectional area of a flow path of an intake pipe 75 so as to control the intake air flow into the engine 71.

Reference numeral 76 means an exhaust tube to introduce a harmful gas exhausted from the engine 71 into the atmosphere. Reference numeral 77 means an oxygen sensor mounted to the exhaust tube 76 to detect an oxygen concentration in the exhaust gas from the engine 71. The oxygen sensor 77 may include a zirconia O$^2$ sensor employing a zirconia element, a titania O$^2$ sensor employing a titania element, and the like. Reference numeral 78 means a temperature sensor mounted to a cooling water path for the engine 71 to detect a cooling water temperature. Reference numeral 79 means an injector to supply fuel by spraying the fuel supplied from a fuel pump (not shown) to an intake valve (not shown) of the engine 71. Reference numeral 80 means exhaust gas purifying means such as three way catalyst converter rhodium to simultaneously purify harmful gas components (including CO, HC, and NOx) in the exhaust gas from the engine 71, or lean NOx catalyst for purifying NOx under an oxygen-excessive atmosphere. Reference numeral 81 means a catalyst holder coupled to the exhaust tube 76 to accommodate the exhaust gas purifying means 80 forming a part of the exhaust tube 76, and the reactor 1 of the exothermic heat generating apparatus.

Reference numeral 82 means a controller (ECU) to calculate an amount of injected fuel depending upon an unillustrated intake air flow signal of the engine 71, revolution of the engine, and a signal of the temperature sensor 78 so as to drive the injector 79, and to feed back and control the amount of injected fuel depending upon a signal of the oxygen sensor 77.

Further, the controller 82 drives the first and second solenoid valves 6 and 7 for control of water introduced into the reactor 1 which is mounted in the upstream side of the exhaust gas purifying means 80, and carries out diagnosis of fault in the solenoid valves. That is, the controller 82 controls water supply means including the first and second solenoid valves 6 and 7, and the pump, and serves as reaction control means for controlling the reversible reaction between the alkali earth oxide and the water.

There is provided another controller (not shown) driven by another driving power system which is energized even when the engine 71 is stopped. This controller controls the electric heaters 18 and 19 by inputting a signal of the water temperature sensor 20, and prevents freezing of the water tank 2.

Figure 10:
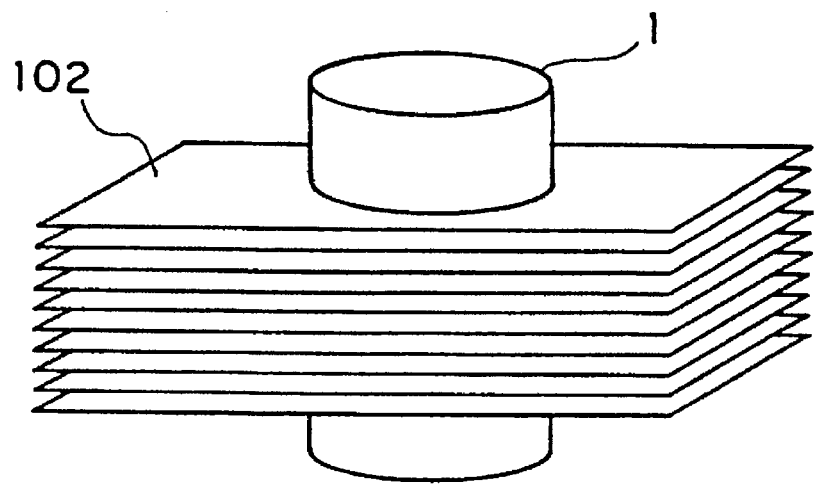
FIG. 10 is a typically perspective view showing an illustrative form of the reactor according to the present invention.

FIG. 10 is a typically perspective view showing an illustrative form of the reactor according to the present invention. The reactor is provided with heat exchanging means such that the calorific value generated from the exothermic heat generating apparatus can be exchanged at high efficiency for heat of the exhaust gas or the catalytic converter rhodium. Reference numeral 1 means a reactor accommodating the calcium oxide, and the reactor 1 may be divided into a plurality of pieces. Reference numeral 102 means a fin of the heat exchanging means for performing efficient heat exchange between the exhaust gas and the heat of reaction. Heat generating in the reactor 1 is transferred to the exhaust gas while the exhaust gas passing through the fins 102. Consequently, the heated exhaust gas heats the catalyst to promote its activity.

Figure 11:
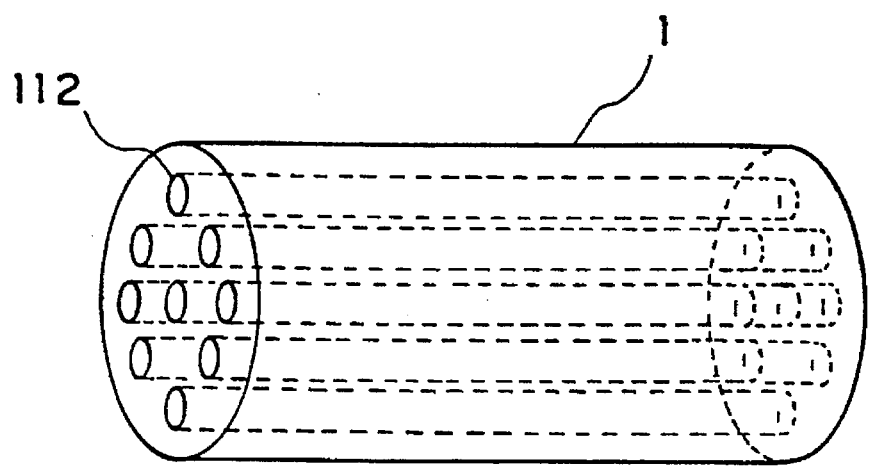
FIG. 11 is a typically perspective view showing another illustrative form of the reactor according to the present invention.

FIG. 11 is a typically perspective view showing another illustrative form of the reactor according to the present invention. A plurality of through-paths 112 are provided in the reactor 1 such that the exhaust gas can pass through the reactor 1 accommodating the calcium oxide. The exhaust gas receives the heat of reaction while passing through the through-paths 112.

A description will now be given of the operation of the exothermic heat generating apparatus according to the present invention.

Before occurrence of the reaction, the first and second solenoid valves 6 and 7 are in a closed state so that the calcium oxide molded product 8 in the reactor 1 is completely insulated from the water in the water tank 2. Such a complete insulation therebetween is indispensable to maintain a heat regenerating state for long periods. The exothermic reaction is started by opening the first solenoid valve 6 to actuate the pump 15, and introducing the water from the water tank 2 into the reactor 1. Thereby, the water vigorously reacts with the calcium oxide. Detailed control of the first and second solenoid valves 6 and 7 will be described below.

In the apparatus of the embodiment, though the water is introduced into the reactor 1 within a period of ten seconds, the exothermic reaction of the calcium oxide is started in the course of the introduction. Hence, hot water vapor is generated in the reactor 1, and pressure of the water vapor pushes back the water in the course of the introduction. The pump 15 is provided to introduce the water against the pressure, and the check valve 14 is also provided to avoid the back flow. At a time of completion of the water introduction, the first solenoid valve 6 is closed. Since the second solenoid valve 7 is also closed, the hot water vapor generated in the reactor 1 has no way for escape. Thus, the water vapor can contribute to the hydration reaction of the calcium oxide in the reactor, thereby promoting the reaction. In addition, since any heat loss due to heat of vaporization of the water is not taken out of the reactor 1, the calorific value from the reactor 1 is not reduced at all. Therefore, it is possible to exhibit a performance according to the designed value.

Figure 12:
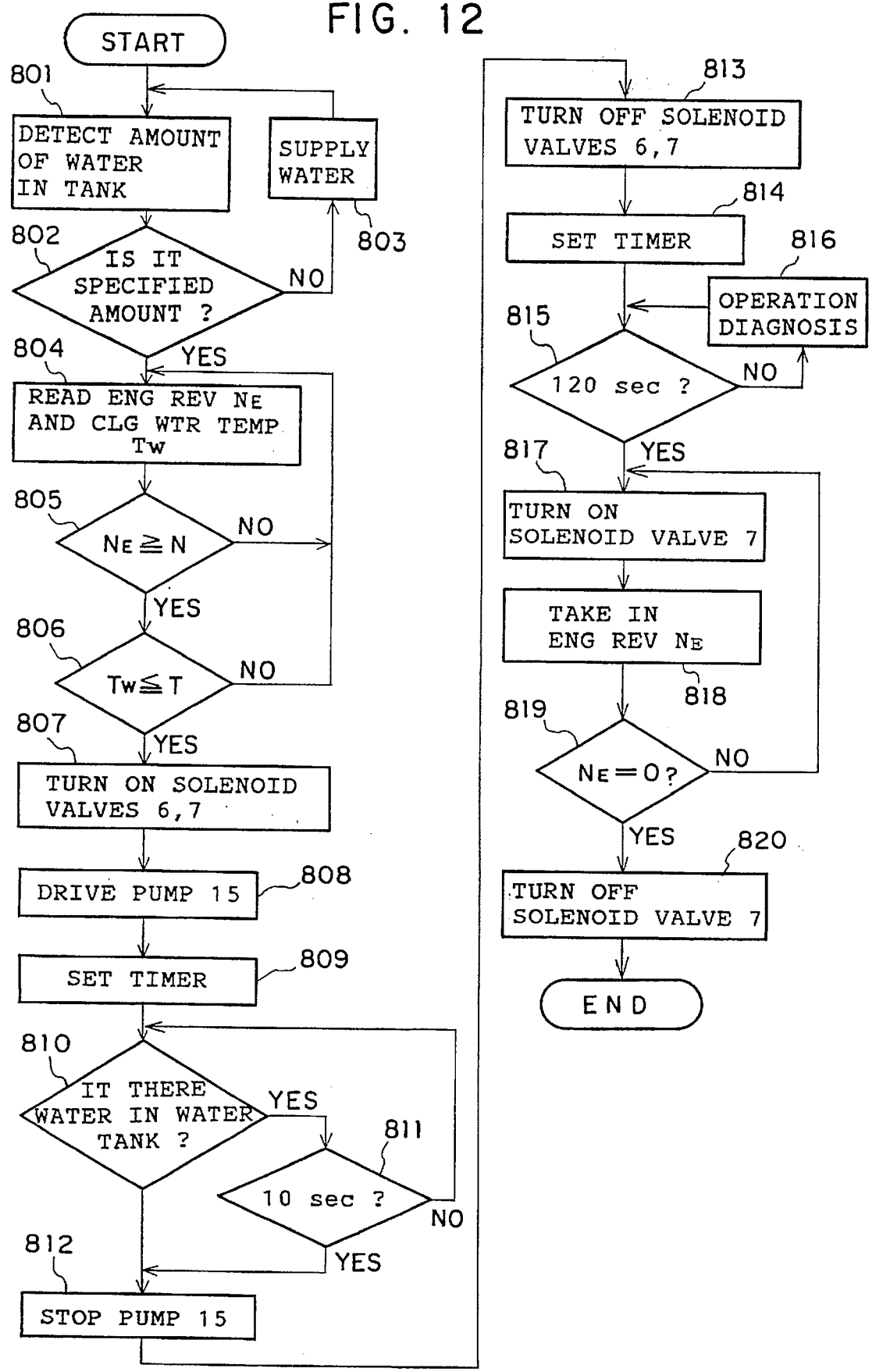
FIG. 12 is a control flowchart of first and second solenoid valves 6, 7 in the on-vehicle exothermic heat generating apparatus in FIG. 9.

FIG. 12 is a control flowchart of the first and second solenoid valves 6 and 7 in the on-vehicle exothermic heat generating apparatus shown in FIG. 9. A key switch (not shown) of the engine 71 is turned ON to actuate the controller 82 serving as the reaction control means so as to carry out a solenoid valve control routine in the exothermic heat generating apparatus.

An amount of water in the by the water tank 2 is detected by the water sensor 13 in Step 801, and it is decided in Step 802 whether or not the amount of water is a specified amount sufficient to react with the calcium oxide in the reactor 1. When the amount of water is equal to the specified amount or less, a driver is alarmed of water deficiency, and the water is supplied in Step 803. In case the amount of water is more than the specified amount of water, an operating state of engine is detected to start the operation of the exothermic heat generating apparatus.

In Step 804, revolution $N_E$ of the engine 71 is read, and a cooling water temperature $T_W$ is read from the temperature sensor 78. In Steps 805 and 806, the engine revolution $N_E$ and the cooling water temperature $T_W$ are respectively compared with predetermined values N and T. In the embodiment, as an example, the values N and T are respectively set to 300 rpm, and 30° C. In this case, in a cold starting state, the engine revolution $N_E$ is equal to 300 rpm or more, and the cooling water temperature $T_W$ is equal to 30° C. or less. When a decision of the cold starting state is given, the first and second solenoid valves 6 and 7 of the exothermic heat generating apparatus are turned ON to start introduction of the water in Step 807. The introduction of water is performed by using the pump 15 as fast as possible in order to cause rapid reaction in the reactor 1. For this purpose, the pump 15 is driven in Step 808.

When the water is introduced into the reactor 1, in Step 810, absence or presence of the water in the water tank 2 is decided depending upon a signal of the water sensor 13. A timer is set in Step 809 so as to avoid ten-seconds or more introduction of water. The ten-seconds or more introduction of water should be avoided because the water vapor may flow out of the reactor 1 or may flow back due to heat of reaction when the first and second solenoid valves 6 and 7 are left released, thereby preventing the hydration reaction by the water vapor to eliminate an increase in the heat of reaction.

At a time of completion of water introduction, the pump 15 is stopped in Step 812, and the first and second solenoid valves 6 and 7 are turned OFF in Step 813. Subsequently, a timer is set in Step 814 to count a time from occurrence of the reaction so as to set the first and second solenoid valves 6 and 7 in the closed state for a period in which the reaction is continued. The period depends upon an amount of calcium oxide or a method of introducing the water, but is set to 120 sec in the embodiment. In a reactive state of the reactor 1, operation diagnosis is carried out in Step 816. The operation diagnosis in Step 816 will be discussed below referring to a flowchart of FIG. 13.

When the reaction is finished, or exothermic heat becomes unnecessary, the second solenoid valve 7 is turned ON. The instruction is carried out in Step 809. The reactor 1 is thereafter heated by heat of a hot exhaust gas exhausted from the engine to decompose the calcium hydroxide in the reactor 1 into the calcium oxide. At the same time, water drained as the water vapor returns to the water tank 2 through the reflux pipe 5, and is condensed and stored in the water tank 2. In Steps 818 and 819, an operating state is decided depending upon the engine revolution. When the engine is stopped and the operation is completed, the second solenoid valve 7 is turned OFF in Step 820. The OFF operation prevents the water vapor from flowing back from the water tank 2 or the piping system into the reactor 1, and from causing the hydration reaction with the decomposed calcium oxide.

Figure 13:
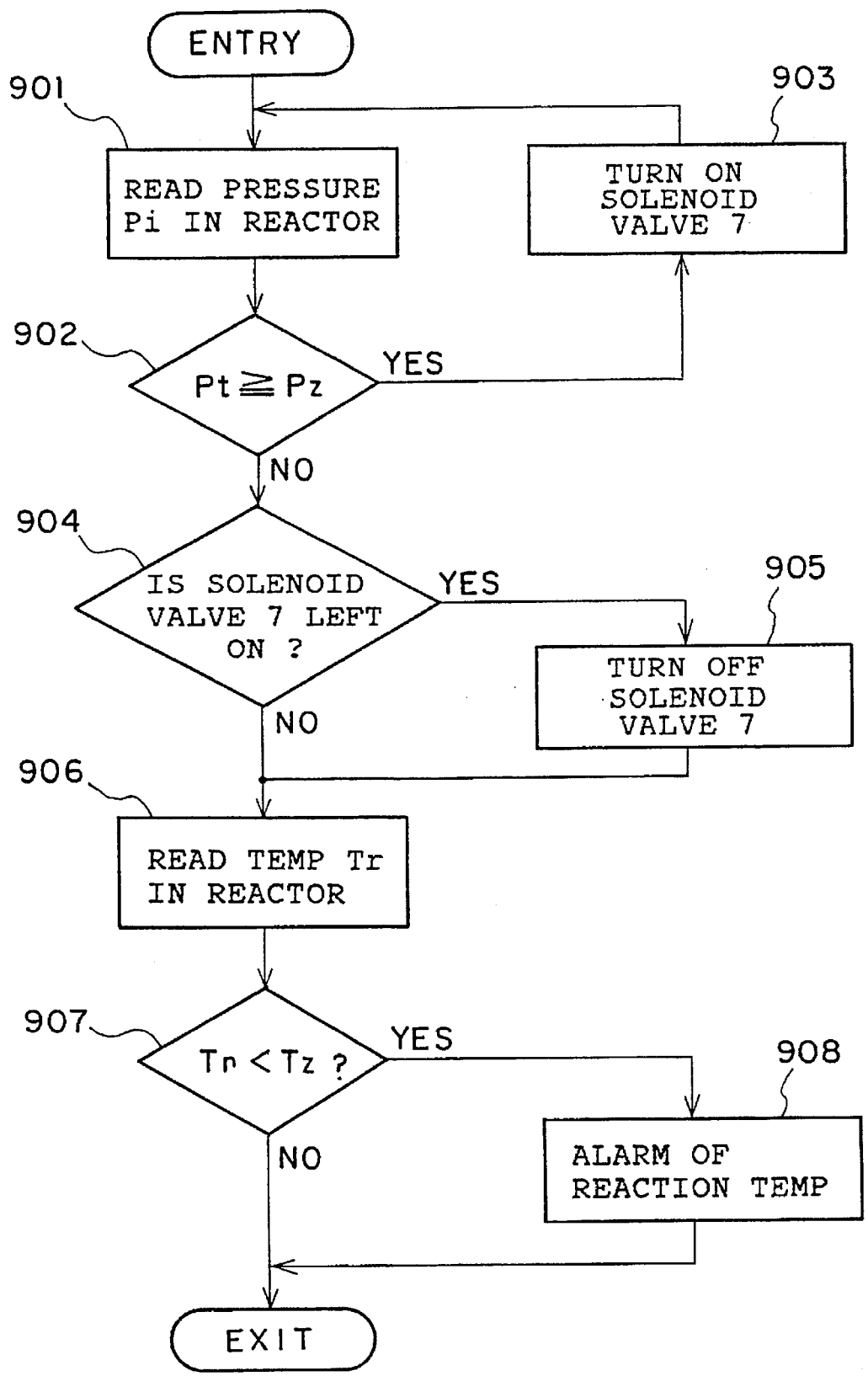
FIG. 13 is a flowchart of operation diagnostic flow during exothermic reaction according to the control flowchart in FIG. 12.

A description will now be given of operation diagnosis flow during the exothermic reaction referring to the flowchart of FIG. 13.

In Step 901, pressure in the reactor 1 is detected by the pressure sensor 21. The detected pressure is compared with preset pressure in Step 902. When the pressure is higher than the preset pressure, the second solenoid valve 7 is released to reduce the pressure in the reactor 1. In the embodiment, the preset pressure Ps is set to 3 Kg/cm$^2$. When the pressure in the reactor 1 is equal to a present value or less by releasing the second solenoid valve 7, the second solenoid valve 7 is closed in Steps 904 and 905.

Next, it is detected whether or not the reaction is promoted to increase a reactor temperature to the positive range. In Step 906, the reactor temperature is detected by the temperature sensor 16. The detected temperature is compared with a preset reactor temperature in Step 907. When the reactor temperature is equal to the preset temperature or less, the driver is alarmed of reaction failure in Step 908. The preset temperature is set to 100° C. in the embodiment. The reaction failure is mainly caused due to decomposition failure into the calcium oxide during the preceding operation. But in rare cases, leakage of the closed cycle and the system may generate carbonation of the calcium oxide, thereby causing the reaction failure.

Figure 14:
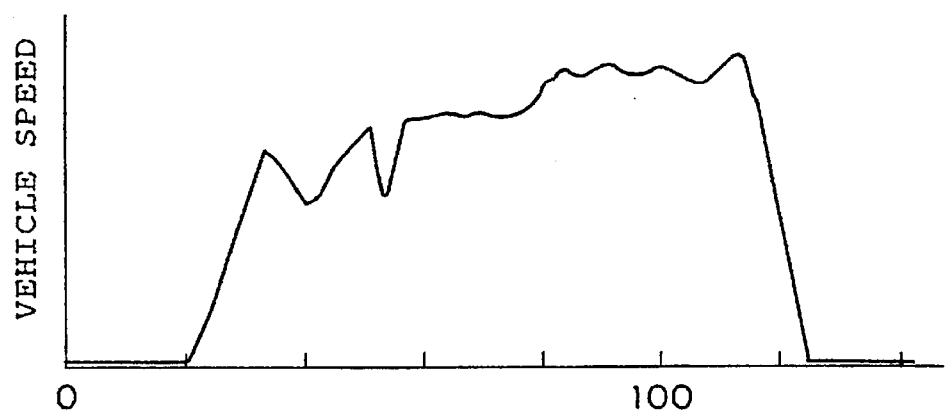
FIG. 14 is a characteristic view showing an effect of reduction of an exhaust gas in the on-vehicle exothermic heat generating apparatus in FIG. 9.
Figure 14:
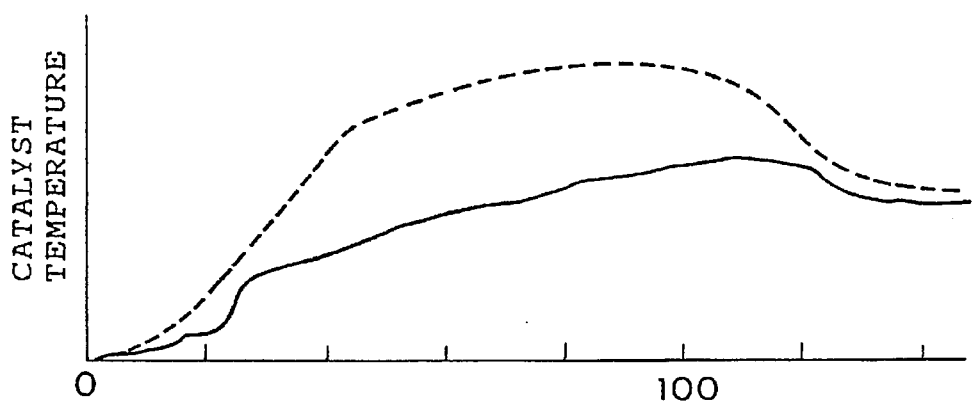
Figure 14:
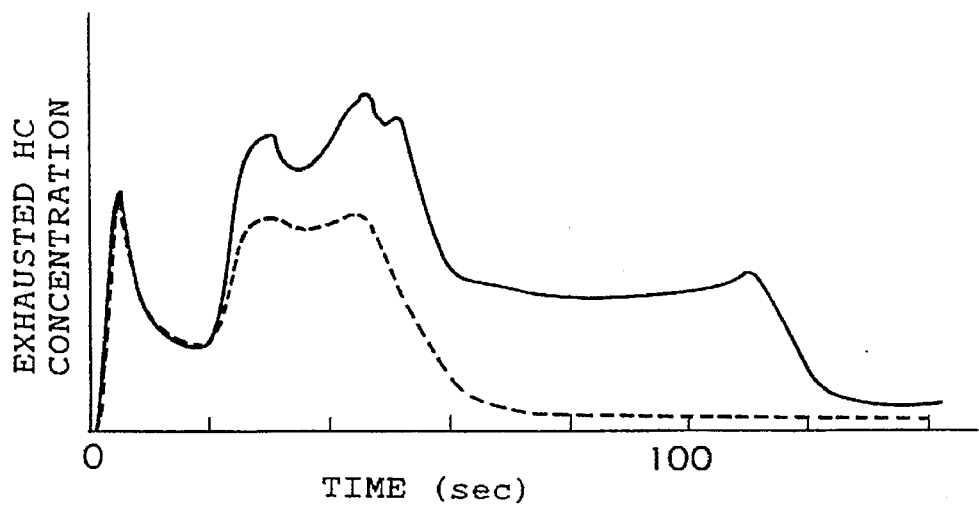

FIG. 14 is a characteristic view showing an effect of reduction of the exhaust gas in the on-vehicle exothermic heat generating apparatus adapted to catalytic heating shown in FIG. 9. The upper graph shows a vehicle speed during exhaust gas measuring mode operation, and shows a first adjustable speed starting from the engine cold start. The middle graph shows catalyst temperatures, for the purpose of comparison, in both a case where the exothermic heat generating apparatus is mounted and a case where the apparatus is not mounted. The lower graph shows a comparison of exhausted HC concentrations according to presence and absence of the exothermic heat generating apparatus. In the middle and lower graphs, the broken characteristic curve shows the case the exothermic heat generating apparatus is mounted, and the solid characteristic curve shows the case no exothermic heat generating apparatus is mounted. When the exothermic heat generating apparatus is mounted, the generating heat is transferred to the catalyst, thereby promoting activity of the catalyst. Therefore, it is possible to purify a harmful exhaust gas such as HC immediately after engine start-up. The harmful gas is exhausted immediately after the engine start-up during the exhaust gas measuring mode operation, and an amount of the harmful gas accounts for about 60% of harmful gas generated in the entire mode operation. Hence, it is remarkably effective to purify the exhaust gas by early activation of the catalyst during the exhaust gas measuring mode operation.

As set forth above, since the exothermic heat generating apparatus in the embodiment employs a closed system, the reversible reaction can be stably carried out for long terms. Further, the reversible reaction can be highly reliably and stably carried out for long terms by the features as described hereinafter. First, the water-excessive composition is employed to reduce the unreacted and remaining calcium oxide, and promote the hydration reaction. Nitrogen is sealed into the closed cycle to avoid leakage of the closed cycle, and avoid entrance of $CO_2$ gas. The calcium oxide is press molded to form a molded product, and the reactor is filled with lamination of the molded products to enhance the fill factor. Further, the heat-resisting perforated members are inserted into gaps between the molded product layers to ensure the water flow path for long terms.

The exothermic heat generating apparatus is applied to the on-vehicle exothermic heat generating apparatus which can eliminate the need for a large capacity vehicle power source and a large capacity charging system required to use a high power electric heater in the order of 2 to 4 KW as a heat source for heating the catalyst at a time of engine start-up. Without an additional apparatus which is costly and causes an increase in weight, it is possible to reduce unburned components reducing an amount of exhausted harmful gas by using reversible exothermic heat at a time of low engine temperature.

Figure 15:
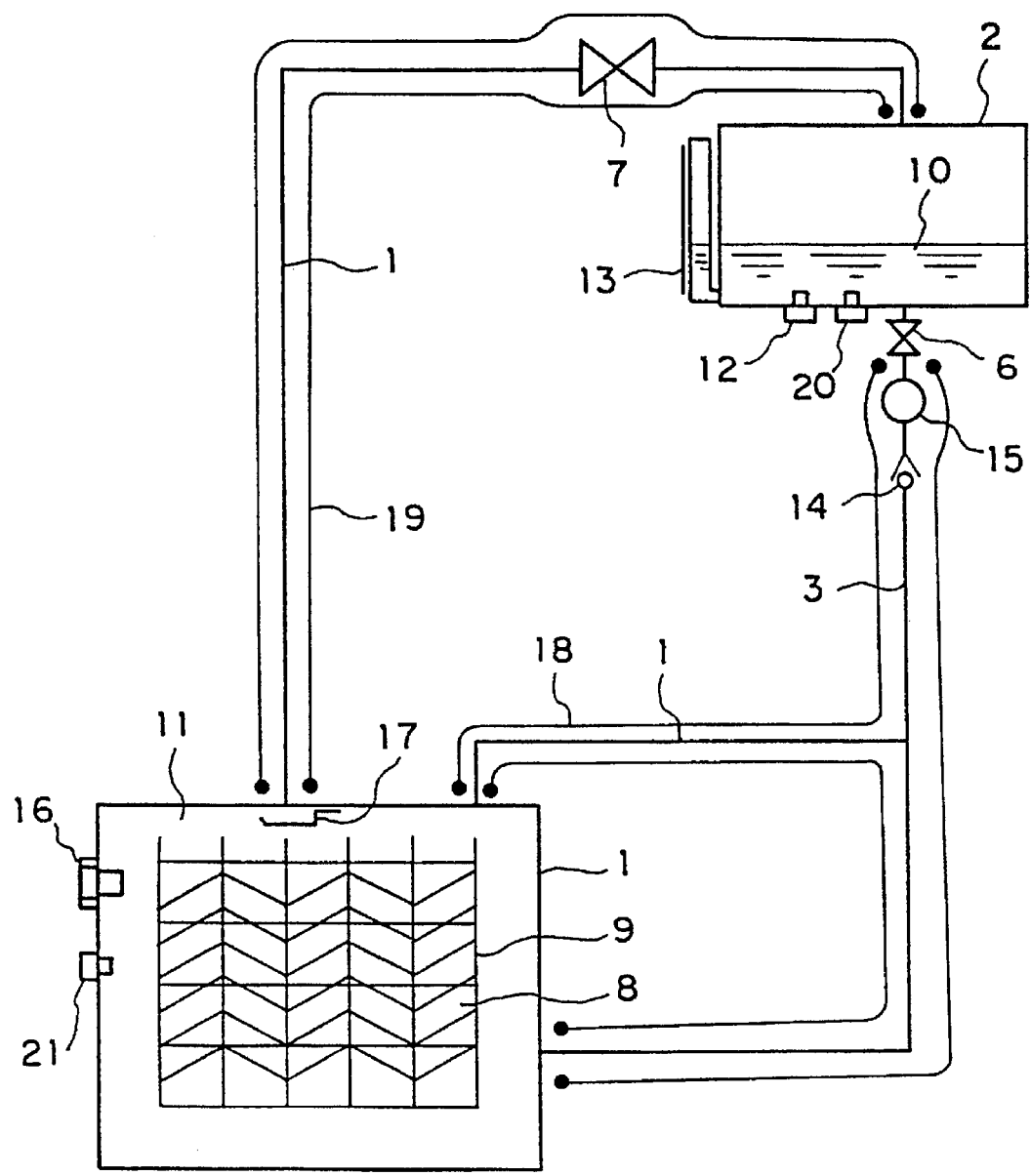
FIG. 15 is a view showing a structure of a second embodiment of the exothermic heat generating apparatus according to the present invention.

FIG. 15 is a view showing a structure of a second embodiment of the exothermic heat generating apparatus according to the present invention. In the embodiment, the water supply pipe 3 for introducing the water from the water tank 2 into the reactor 1 is branched in the course thereof. A branch pipe 4 is provided to divide the flow path into a plurality (two in the embodiment) of flow paths so as to supply the water into the reactor 1 from upper and lower positions. As stated above, in addition to one water supply path from the lower position, the water is supplied to the reactor 1 through the upper position, that is, through a plurality of positions. It is thereby possible to accelerate the hydration reaction of the calcium oxide, and increase the calorific value per unit time. As a result, a temperature rising speed of the reactor can be accelerated to improve heat exchanger effectiveness.

As described above, the water is preferably poured into the reactor 1 from both the upper and lower positions, and a perforated piping system is preferably mounted onto a cell section in the reactor 1 to effectively distribute the water. The above modifications can more accelerate the temperature rising speed. A characteristic of the reactor 1 chiefly depends upon a division ratio of the upper position to the lower position in the supplied amount of water. Hence, it must be noted that the division ratio should be designed to provide the optimal performance.

Figure 16:
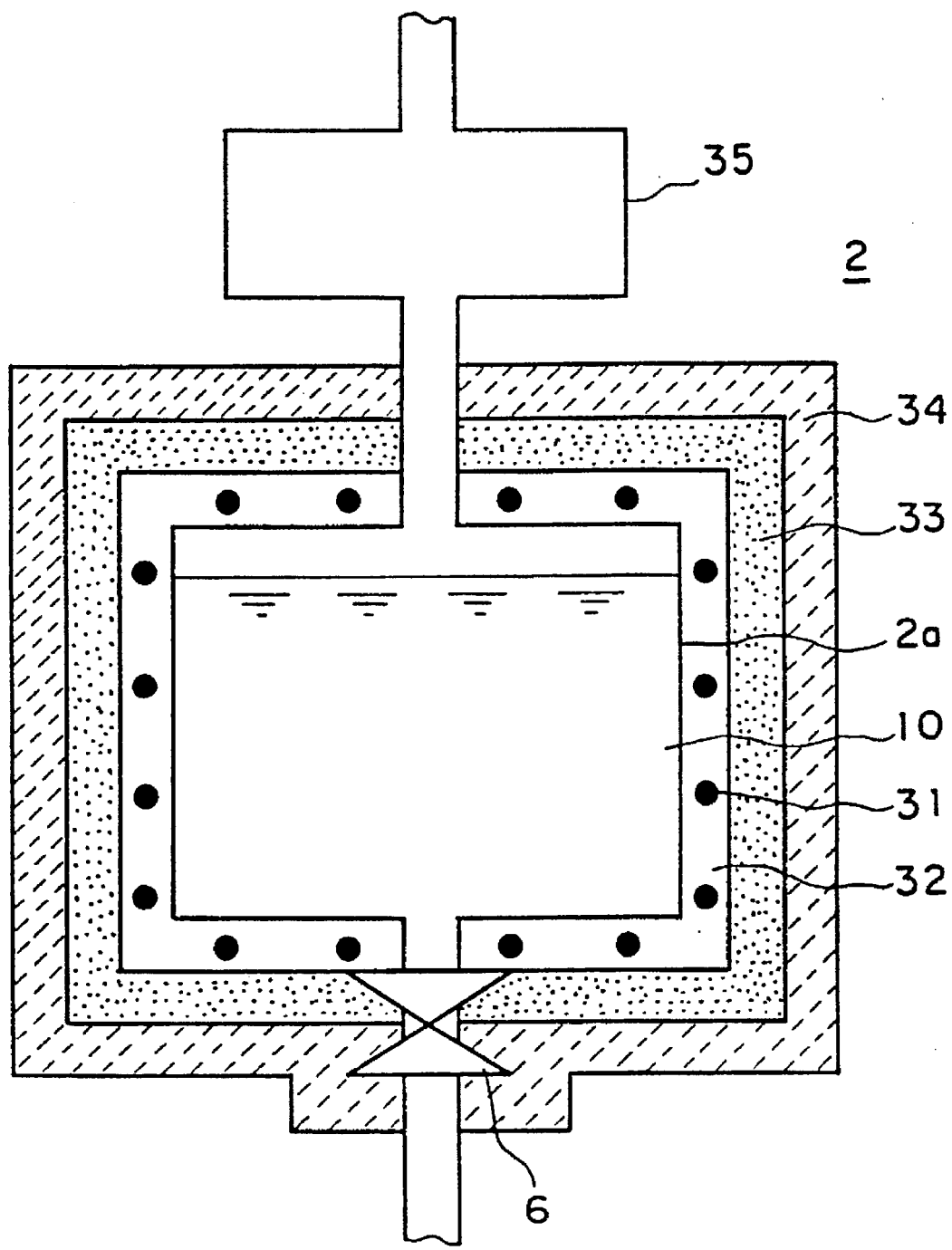
FIG. 16 is a view showing a structure of a water tank in a third embodiment of the exothermic heat generating apparatus according to the present invention.

FIG. 16 is a view showing a structure of a water tank in a third embodiment of the exothermic heat generating apparatus according to the present invention. Reference numeral 35 means a fin condenser (a fin being omitted in the drawing) to condense the hot water vapor. The hot water vapor can be efficiently condensed by the condenser 35. It is thereby possible to reduce a rise of vapor pressure in the closed cycle (i.e., in the system of reaction), and to facilitate decomposition of the calcium hydroxide.

Figure 17:
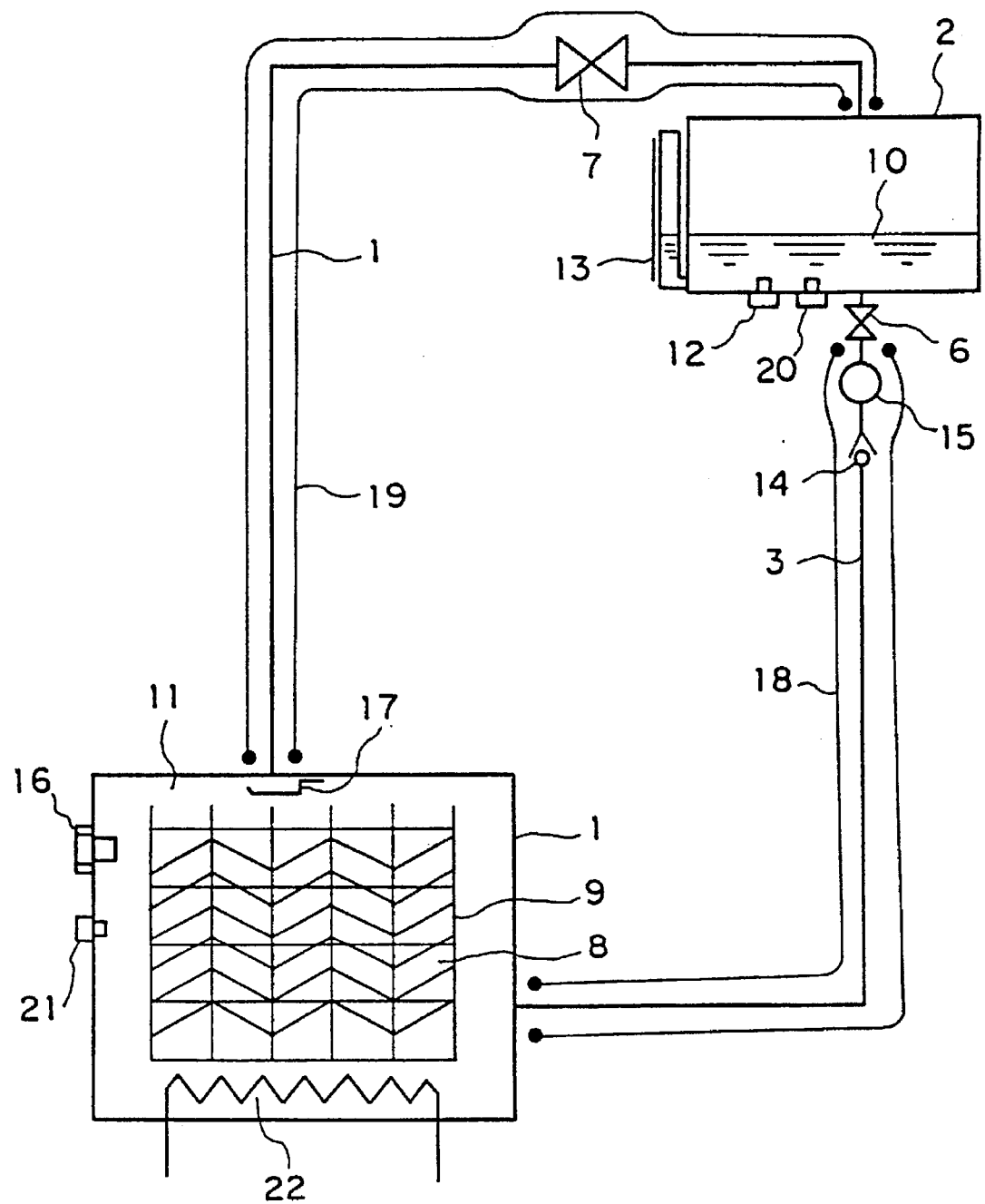
FIG. 17 is a view showing a structure of a fourth embodiment of the exothermic heat generating apparatus according to the present invention.

FIG. 17 is a view showing a structure of a fourth embodiment of the exothermic heat generating apparatus according to the present invention. In the embodiment, an electric heater 22 serving as heating means is provided in the reactor 1 to promote the decomposition of the calcium hydroxide. The electric heater 22 is energized when it is decided depending upon a temperature state of the reactor 1 and an operating state of the internal combustion engine that the calcium hydroxide is not sufficiently decomposed by exhaust heat from the internal combustion engine. Consequently, the calcium hydroxide which is not decomposed by the exhaust heat will be completely decomposed by heat of the electric heater 22.

In the embodiment, the exhaust heat of the internal combustion engine, and the electric heater 22 can serve as the heating means. Thus, it is possible to heat and completely decompose the calcium hydroxide so as to regenerate the calcium oxide. Therefore, the entire filled calcium oxide can continuously contribute to the hydration reaction to provide calorific value according to the designed value.

Though the heater 22 is mounted under the calcium oxide molded product 8 in the embodiment, it must be noted that the calcium oxide molded product may include the heater 22, or a molded product accommodating pipe 9 itself may have an electric heater structure.

Figure 18:
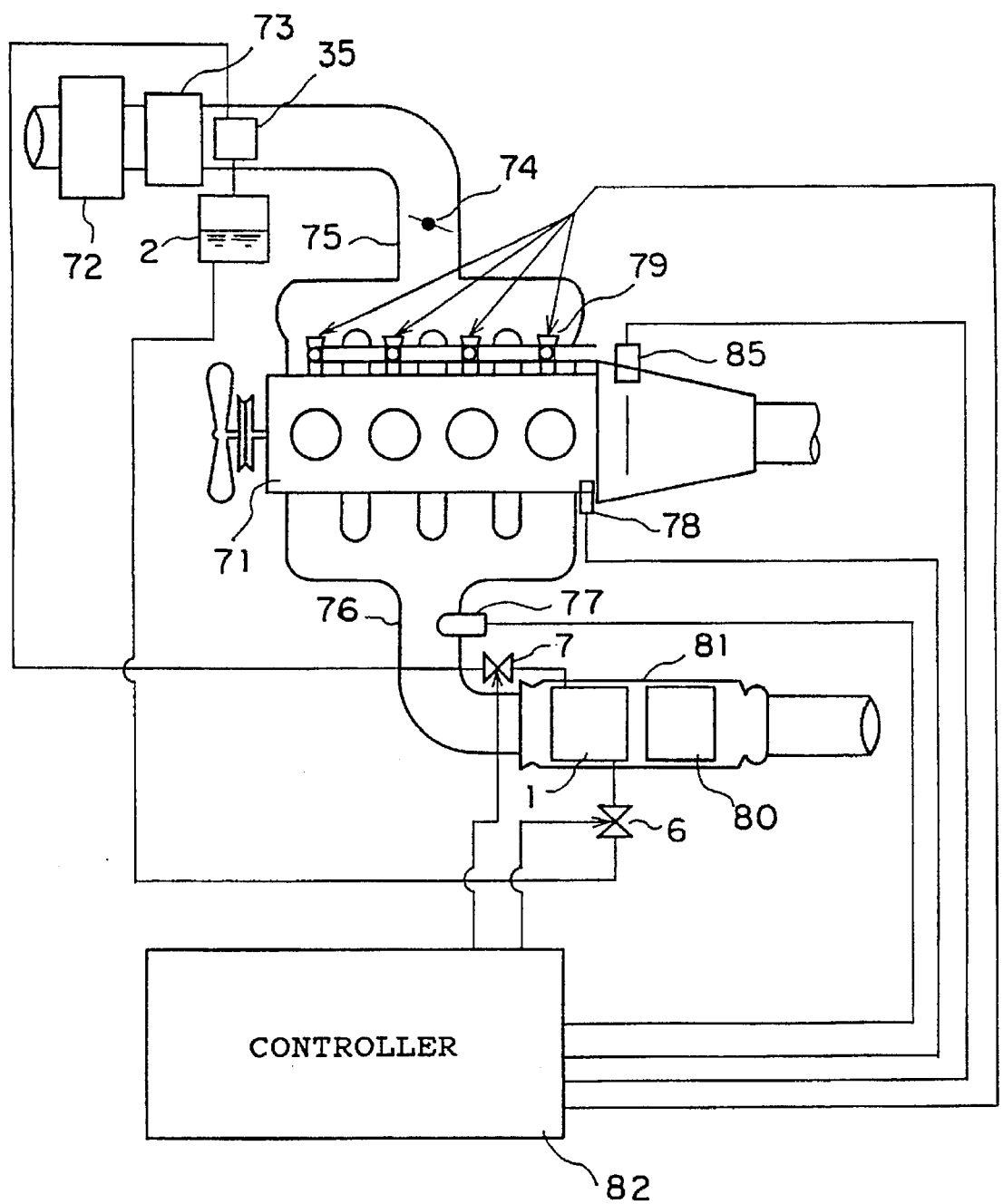
FIG. 18 is a view showing a structure of a fifth embodiment of the on-vehicle exothermic heat generating apparatus according to the present invention.

FIG. 18 is a view showing a structure of a fifth embodiment of the on-vehicle exothermic heat generating apparatus in which the exothermic heat generating apparatus according to the present invention is mounted on a vehicle. In the structure according to the embodiment, a fin condenser 35 is mounted in an intake pipe 75 between an intake air sensor 73 and a throttle valve 74 to condense water vapor generated due to decomposition of calcium oxide. In the structure, it is possible to cool and condense the hot water vapor generated due to the decomposition of the calcium oxide by intake air, and use heat of condensation to heat the intake air. A temperature rise of the intake air can promote vaporization of fuel supplied to the internal combustion engine so as to improve combustion, and reduce the unburned components in an exhaust gas. The intake air heating in the embodiment is effective in reduction of an unburned gas in the exhaust gas for a severe winter.

Figure 19:
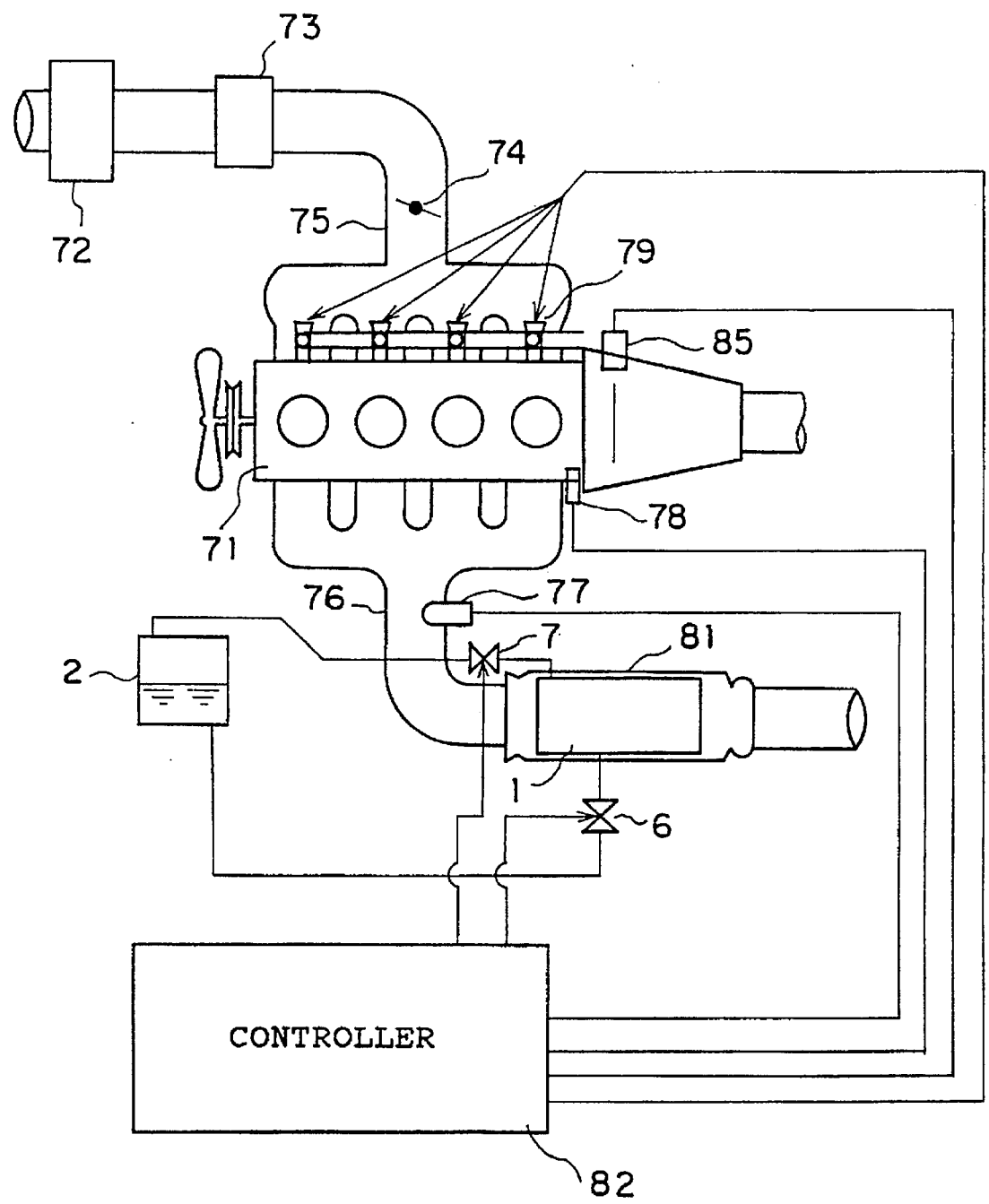
FIG. 19 is a view showing a structure of a sixth embodiment of the on-vehicle exothermic heat generating apparatus according to the present invention.

FIG. 19 is a view showing a structure of a sixth embodiment of the on-vehicle exothermic heat generating apparatus according to the present invention. The exhaust gas purifying catalyst 80 is mounted adjacent to the reactor 1 in a catalyst holder 81 in the above embodiment shown in FIG. 9. However, in the embodiment, the exhaust gas purifying catalyst 80 is removed, and an exhaust gas purifying catalyst is directly supported on a surface of the reactor 1.

In the embodiment, heat generating in the reactor 1 is directly transferred to the exhaust gas purifying catalyst, thereby efficient heating. Hence, a catalyst activating time is reduced to improve purification of the exhaust gas.

Further, it must be noted that the exhaust gas purifying catalyst may be supported on, for example, fins 102 serving as heat exchanging means provided for the reactor 1 shown in FIG. 10, or a surface of the through-path 112 shown in FIG. 11, resulting in the same effects.

In the detailed descriptions in the above embodiments, the calcium oxide (CaO) and the water are employed. However, it must be noted that the present invention should not be limited to CaO, and other alkali earth oxides including MgO, SrO, and BaO may be used with the water to provide the same exothermic heat generating apparatus and the same effects. Alternatively, a mixed oxide of the alkali earth oxides may be used to provide the same apparatus and the same effects.

In the above embodiments, a description has been given with reference to a case the apparatus is used as a heat source for rapidly heating in the vehicle or the like. However, it is possible to decelerate a reaction rate and control the reaction rate by adding, for example, several percents sodium silicate.

Further, in the above embodiments, the exothermic heat generating apparatus is applied to the on-vehicle exothermic heat generating apparatus. However, it must be noted that the present invention should not be limited to mobile applications, and may be applied for industrial uses.

For example, it is possible to substitute the exothermic heat generating apparatus for several types of apparatus employing a heat regenerating material which is designed for practical use to have latent heat of fusion or sensible heat (specific heat) ranging from 200° to 500° C. The exothermic heat generating apparatus can realize cost reduction, lower maintenance cost, and higher heat efficiency. This is because $CaO/Ca(OH)_2$ exothermic material is superior to the heat regenerating material in many items.

As one example, Table 4 shows a comparison between the exothermic material and $NaOH$—$NaNO_3$ mixed material (81.5 mol %–18.5 mol %) which is proposed as the heat regenerating material using the latent heat of fusion.

TABLE 4

|  | LATENT HEAT (cal/g) | MELTING POINT (°C.) | COST OF MATL (yen/Kg) |
| --- | --- | --- | --- |
| EXOTHERMIC MATERIAL | 213 | 400 TO 500 | TO 30 |
| HEAT REGENERATING MATERIAL | 67 | 259 | TO 90 |
| EXOTHERMIC MATL/HEAT REGENERATING MATL | 3.2 | 1.7 | ⅓ |

The exothermic material has three times or more as much latent heat as the heat regenerating material. The heat regenerating material has latent heat of fusion exceeding 70 cal/g so rarely that the $CaO/Ca(OH)_2$ exothermic material is obviously superior to the heat regenerating material. Large latent heat can provide far-reaching effects such as a downsized system, and cost reduction of material.

Cost per weight in the exothermic material is one-third of that in the heat regenerating material. Accordingly, in view of cost per 1 Kcal, the exothermic material is about one-tenth of the heat regenerating material. The cost reduction shows great merit because the cost of material is more greatly reduced as storage capacity of energy becomes larger.

Unlike the heat regenerating material, the exothermic material does not have a clear melting point. However, an exothermic temperature during heat dissipation and a decomposition temperature during heat regeneration can be regarded as an apparent melting point corresponding temperature. From this standpoint, it can be considered that the melting point during the heat dissipation is about 500° C. There is no doubt that the material is more preferable for a user as the melting point of the material becomes higher, and the preferable material enables design of inexpensive and convenient system having high heat exchanger effectiveness. On the other hand, the decomposition temperature can be regarded as the melting point during the heat regeneration, and the decomposition temperature is about 400° C. in a normal state, that is, at water vapor pressure (ranging to 30 Torr, i.e., 4000 Pa) of water having a substantially room temperature. As the water vapor pressure balanced in a closed system is more reduced, the decomposition temperature can be more reduced. For example, water vapor pressure (ranging to 1 Torr, i.e., 100 Pa) of water having a temperature of about −20° C. can reduce the decomposition temperature to about 300° C. This condition can be extremely easily achieved at a position where a liquefied natural gas can be used.

The exothermic heat generating apparatus can be applied in reality to one field, that is, a heat regenerating apparatus using hot and high pressure steam (having temperatures of 500° C. or more) at a time of low load operation in a thermal power plant or an atomic power plant. Further, the exothermic heat generating apparatus can be effectively used as an auxiliary heat source when the load rapidly rises. The decomposition temperature of about 400° C. can facilitate heat regenerating operation by regeneration, and the exothermic temperature of about 500° C. during the heat dissipation enables efficient conversion to high-quality steam. Above all, an excellent rise characteristic is convenient.

Further, as another application, the exothermic heat generating apparatus can be used as various types of heat regenerating apparatus for purpose of effective utilization of energy in a refuse incinerator and the like. An amount of waste heat in the refuse incinerator is largely fluctuated day by day, and various types of plants are installed adjacent to the refuse incinerator for using its waste heat. The exothermic heat generating apparatus may be designed so as to store a daily amount of excessively generating waste heat in preparation for lack of energy required to heat and cool the plants. Further, the exothermic heat generating apparatus can be used to adjust a difference between an operating time zone of the refuse incinerator and an energy requiring time zone of the various plants.

Since the exothermic heat generating apparatus has an operating temperature ranging from 200° to 500° C., the apparatus can be directly used as a heat source at a time of steam heating. In addition, the apparatus can exhibit a sufficient performance as a heat source for driving a cooler at a cooling period in the summer season, such as an air-conditioner employing the Rankine cycle. That is, the apparatus serves as an excellent driving heat source for an absorption-refrigerator and a heating and cooling apparatus. As a result, it is possible to provide a great effect of smoothing a peak of electric power demand in the summer season in Japan.

Further, the waste heat from various types of manufacturing plants can be effectively recovered and can be used as a preheat source. This can realize cost reduction of energy in the entire factory, and can improve utilization factor of energy.

In a field using a fuel cell, in the prior art, an electric heater has been used as a heat source at a time of rising, for example, a fused carbonate fuel cell (having the operating temperature ranging to 650° C.). However, the exothermic heat generating apparatus can efficiently carry out, for example, preheat of a fuel gas, thereby reducing required electric energy. Further, the exothermic heat generating apparatus can be used for various purposes in a co-generation system effectively using the heat generated from the fuel cell. This is because the fuel cell can continuously provide a sufficiently large amount of a hot exhaust gas required for regeneration in the exothermic heat generating apparatus.

Further, the exothermic heat generating apparatus can be used as a heating source at a time of rising a methanol electrolytic catalyst or as a heat source for vaporization of methanol in an electric vehicle equipped with a solid electrolytic fuel cell. When the methanol is decomposed into hydrogen and CO, the catalyst requires preferable operating temperature in the order of 300° C. It is impossible to avoid a large time delay as long as heating is carried out by the electric heater. However, it is possible to carry out extremely rapid heating at the time of rising, and easily regenerate at a later catalyst operating temperature by an appropriate combination of the exothermic heat generating apparatus and a catalytic apparatus. The effect and operational principle have been described above.

As set forth above, the exothermic heat generating apparatus according to the present invention can provide several effects as described below.

The closed cycle includes the reactor filled with the alkali earth oxide, the water tank for storing water, the water supply pipe for supplying the water from the water tank into the reactor, and the reflux pipe for returning the water from the reactor into the water tank. The reversible reaction between the alkali earth oxide and the water is caused in the closed system. As a result, it is possible to provide the exothermic heat generating apparatus which enables stable reversible reaction for long terms. Further, the exothermic heat generating apparatus is provided with the water supply means for controlling water supply to and drain from the reactor, the heating means for heating and decomposing the alkali earth hydroxide in the reactor to regenerate the alkali earth oxide, and the reaction control means for controlling the water supply means to control the reversible reaction between the alkali earth oxide and the water. As a result, it is possible to conveniently control the reversible reaction with high accuracy, and efficiently use heat generated according to the hydration reaction.

A composition ratio of the alkali earth oxide to water in the closed cycle is set to provide the water-excessive composition. As a result, it is possible to avoid reduction of reactivity at a time of hydration reaction, and reduction of the calorific value so as to promote the hydration reaction.

Since at least one of the rare gas and the nitrogen gas is sealed into the closed cycle, it is possible to avoid leakage of the closed cycle, entrance of $CO_2$ gas, and deterioration of performance.

The alkali earth oxides molded product has a flat form, and the reactor is filled with layered molded products. As a result, it is possible to improve the fill factor, and provide a smaller reactor. Further, the heat-resisting perforated members are inserted into the gaps between the layers, and into the gaps extending parallel to a layering direction. As a result, it is possible to ensure the water flow path for long terms, enhance distribution of the water, accelerate a reaction rate, and improve reversibility of reaction.

The water is supplurd into the reactor from the plurality of positions including the upper and lower positions, resulting in a more rapid rise of reaction.

The water tank includes, starting from the inside, the water storage tank, the heater for heating the water, the layer of heat regenerating material having the melting point ranging from 10° to 30° C., and the heat insulating layer. As a result, it is possible to effectively avoid dissipation of the water in the water tank. In addition, the water temperature sensor is mounted to detect the water temperature, and actuate the heater so as to heat the water according to appropriate timing. As a result, freezing of the water can be efficiently avoided.

The condenser is provided on the side of the reflux pipe of the water tank so that the water can be efficiently condensed.

Since the reactor includes the heater as heating means, it is possible to heat and decompose the alkali earth hydroxide so as to completely regenerate the alkali earth oxide.

Further, the exothermic heat generating apparatus may be provided with the operating state detecting means for detecting the operating state of the internal combustion engine, and the reaction state detecting means for detecting a state of the reaction between the alkali earth oxide and the water depending upon states of the reactor and the water tank. The reaction control means controls the reversible reaction between the alkali earth oxide and the water depending upon the operating state and the reaction state. As a result, it is possible to provide the on-vehicle exothermic heat generating apparatus which can carry out efficient reversible reaction, and can rapidly heat the catalytic section, the air intake section and the like at the time of engine start-up without a large capacity vehicle power source, a large capacity battery, or the like.

The condenser is mounted in a vehicle travelling wind collision section or an intake pipe of the internal combustion engine. Thus, the water vapor from the reactor is cooled and condensed by travelling wind or intake wind. As a result, it is possible to effectively condense the water vapor, and heat the intake air so as to promote vaporization of fuel and reduce an unburned gas.

The exhaust gas purifying catalyst is supported on the reactor or the surface of the heat exchanging means mounted thereto, and either the reactor or the heat exchanging means is mounted in the exhaust pipe. As a result, it is possible to rapidly heat and activate the catalyst, and reduce exhaust of unburned components in the cold season.

While preferred embodiments of the invention have been described using specific terms, such description is for illustrative purposes only, and it is to be understood that changes and variations may be made without departing from the spirit or scope of the following claims.

What is claimed is:

1. An exothermic heat generating apparatus comprising:
   a closed cycle including a reactor filled with alkali earth oxide, a water tank to store water, a water supply pipe to supply the water from said water tank into said reactor, and a reflux pipe to return the water from said reactor to said water tank;
   water supply means for controlling water supply to and drain from said reactor;
   heating means for heating and decomposing alkali earth hydroxide in said reactor to regenerate the alkali earth oxide;
   reaction state detecting means for detecting a state of the reaction between the alkali earth oxide and the water depending upon states of said reactor and said water tank; and
   reaction control means for controlling said water supply means to control reversible reaction between said alkali earth oxide and the water based upon the detected state;
   wherein heat generated by hydration reaction of said alkali earth oxide is utilized.

2. An exothermic heat generating apparatus according to claim 1, wherein a composition ratio of alkali earth oxide to water in said closed cycle is set to provide water-excessive composition.

3. An exothermic heat generating apparatus according to claim 1 or 2, wherein at least one of a rare gas and a nitrogen gas is sealed into said closed cycle.

4. An exothermic heat generating apparatus according to claim 1 or 2, wherein an alkali earth oxide molded product has a flat form, said reactor being filled with layered molded products, and heat-resisting perforated members being inserted into gaps between the layers, and into gaps extending parallel to a layering direction.

5. An exothermic heat generating apparatus according to claim 1 or 2, wherein water is supplied into said reactor from a plurality of positions including upper and lower positions.

6. An exothermic heat generating apparatus according to claim 1 or 2, wherein said water tank includes, starting from the inside, a water storage tank, a heater for heating the water, a layer of heat regenerating material having the melting point ranging from 10° to 30° C., and a heat insulating layer, and said water tank having a water temperature sensor to detect a water temperature.

7. An exothermic heat generating apparatus according to claim 1 or 2, wherein a condenser is provided on the side of the reflux pipe of the water tank.

8. An exothermic heat generating apparatus according to claim 1 or 2, wherein said reactor includes a heater as heating means.

9. An on-vehicle exothermic heat generating apparatus comprising:
   a closed cycle including a reactor filled with alkali earth oxide, a water tank to store water, a water supply pipe to supply the water from said water tank into said reactor, and a reflux pipe to return the water from said reactor to said water tank;
   water supply means for controlling water supply to and drain from said reactor;
   heating means for heating and decomposing alkali earth hydroxide in said reactor to regenerate the alkali earth oxide; and
   reaction control means for controlling said water supply means to control reversible reaction between the alkali earth oxide and the water;
   operating state detecting means for detecting an operating state of a vehicle internal combustion engine; and
   reaction state detecting means for detecting a state of the reaction between the alkali earth oxide and the water depending upon states of said reactor and said water tank;
   wherein heat generated by hydration reaction of the alkali earth oxide is utilized, and said reaction control means controlling said reversible reaction between the alkali earth oxide and the water depending upon said operating state and said reaction state.

10. An on-vehicle exothermic heat generating apparatus according to claim 9, wherein a condenser is mounted in a vehicle travelling wind collision section or in an intake pipe of an internal combustion engine to cool and condense water vapor from said reactor by travelling wind or intake wind.

11. An on-vehicle exothermic heat generating apparatus according to claim 9 or 10, wherein an exhaust gas purifying catalyst is supported on said reactor or a surface of heat exchanging means mounted thereto, and either said reactor or said heat exchanging means being mounted in an exhaust pipe.

12. An on-vehicle exothermic heat generating apparatus according to claim 9 or 10, wherein a composition ratio of alkali earth oxide to water in said closed cycle is set to provide water-excessive composition.

13. An on-vehicle exothermic heat generating apparatus according to claim 9 or 10, wherein at least one of a rare gas and a nitrogen gas is sealed into said closed cycle.

14. An on-vehicle exothermic heat generating apparatus according to claim 9 or 10, wherein an alkali earth oxide molded product has a flat form, said reactor being filled with layered molded products, and heat-resisting perforated members being inserted into gaps between the layers, and into gaps extending parallel to a layering direction.

15. An on-vehicle exothermic heat generating apparatus according to claim 9 or 10, wherein water is supplied into said reactor from a plurality of positions including upper and lower positions.

16. An on-vehicle exothermic heat generating apparatus according to claim 9 or 10, wherein said water tank includes, starting from the inside, a water storage tank, a heater for heating the water, a layer of heat regenerating material having the melting point ranging from 10° to 30° C., and a heat insulating layer, and said water tank having a water temperature sensor to detect a water temperature.

17. An on-vehicle exothermic heat generating apparatus according to claim 9 or 10, wherein a condenser is provided on the side of the reflux pipe of the water tank.

18. An on-vehicle exothermic heat generating apparatus according to claim 9 or 10, wherein said reactor includes a heater as heating means.

* * * * *